US012463876B2

(12) United States Patent
Titon et al.

(10) Patent No.: US 12,463,876 B2
(45) Date of Patent: Nov. 4, 2025

(54) UTILIZING MONITORING SERVICE EXPLORATION TO IMPROVE SERVICE INCIDENT MITIGATION AND LOCALIZATION

(71) Applicant: Microsoft Technology Licensing, LLC, Redmond, WA (US)

(72) Inventors: Myriam Titon, Jerusalem (IL); Adir Hudayfi, Eilat (IL); Zakie Mashiah, Qiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 18/169,009

(22) Filed: Feb. 14, 2023

(65) Prior Publication Data

US 2024/0275699 A1 Aug. 15, 2024

(51) Int. Cl.

| | |
|---|---|
| ***H04L 41/5074*** | (2022.01) |
| ***G06F 16/35*** | (2019.01) |
| ***H04L 41/069*** | (2022.01) |

(52) U.S. Cl.
CPC .......... *H04L 41/5074* (2013.01); *G06F 16/35* (2019.01); *H04L 41/069* (2013.01)

(58) Field of Classification Search
CPC . H04L 41/06; H04L 41/0604; H04L 41/0609; H04L 41/0613; H04L 41/0618;
(Continued)

(56) References Cited

U.S. PATENT DOCUMENTS 5,666,481 A * 9/1997 Lewis ................. H04L 41/0631 714/712
8,015,278 B1 * 9/2011 Papa .................. H04L 41/5074 709/224
(Continued)

FOREIGN PATENT DOCUMENTS

WO 2022046211 A1 3/2022

OTHER PUBLICATIONS

Disclosed Without Attribution. "Incident based model for intelligently combining related call home events into a single service ticket." IP.com Prior Art Database. Sep. 21, 2015 (Year: 2015).*
(Continued)

*Primary Examiner* — Vivek Srivastava
*Assistant Examiner* — William C McBeth
(74) *Attorney, Agent, or Firm* — Ray Quinney & Nebeker P.C.; Christopher K. Hallstrom

(57) ABSTRACT

The disclosure relates to utilizing a service incident resolution system to determine and mitigate service incidents in a cloud computing system. For example, based on identifying an outage ticket (e.g., a customer-impacting incident ticket), the service incident resolution system identifies additional context of the outage by detecting a number of relevant monitoring signals. For instance, the service incident resolution system utilizes various monitoring signals and service models to determine monitoring signals that are relevant to the outage ticket by efficiently selecting relevant monitor signals and filtering out noisy signals. In this way, vaguely reported outages are supplemented with rich information that enable these outages to be resolved more quickly. Additionally, the service incident resolution system may utilize service-based models to efficiently send a report of an outage to a service or mitigation team that is well-equipped to quickly address the outage.

17 Claims, 10 Drawing Sheets

100

Identify An Outage Ticket For A Service Incident At A Cloud Computing System 110

Outage Ticket

Generate Groups Of Monitoring Incident Tickets That Occurred Around The Time Of The Outage Ticket And Having Given Severity Levels 120

Time Window → Severity Level → Monitoring Identifiers → Monitoring Incident Ticket Groups Generate Service Incident Scores For The Monitoring Incident Tickets Based On The Monitoring Service Groups, Monitoring Service Factors, And Outage Ticket Refinements 130

Monitoring Incident Ticket Groups; Outage Ticket → Service Incident Monitoring Model → Scored Monitoring Incident Tickets Provide A List Of Monitoring Incident Tickets Ranked For The Outage Ticket 140

Scored Monitoring Incident Tickets → Ranked Monitoring Incident Tickets

Generate A List Of Relevant Mitigation Teams For The Outage Ticket 150

Monitoring Incident Tickets; Outage Ticket → Mitigation Teams Relevancy Model → Relevant Mitigation Teams List

(58) Field of Classification Search
CPC ............. H04L 41/0622; H04L 41/0631; H04L 41/064; H04L 41/065; H04L 41/069; H04L 41/16; H04L 41/5074; G06Q 10/063112
See application file for complete search history.

(56) References Cited

U.S. PATENT DOCUMENTS

| | | | | |
|---|---|---|---|---|
| 10,977,293 | B2 | 4/2021 | Cai | |
| 11,218,357 | B1 * | 1/2022 | Salinas | H04L 41/5074 |
| 11,416,325 | B2 | 8/2022 | Mann | |
| 11,516,069 | B1 * | 11/2022 | Satish | H04L 41/0631 |
| 11,595,243 | B1 * | 2/2023 | Schreiber | H04L 41/064 |
| 11,714,698 | B1 * | 8/2023 | Curtis | G06F 11/0769 714/48 |
| 2006/0087409 | A1 * | 4/2006 | Korzeniowski | H04L 41/0631 340/286.02 |
| 2008/0114874 | A1 * | 5/2008 | Meir | H04L 41/065 709/224 |
| 2012/0072782 | A1 * | 3/2012 | Hughes | H04L 12/6418 714/57 |
| 2014/0129536 | A1 | 5/2014 | Anand | |
| 2015/0280968 | A1 * | 10/2015 | Gates | H04L 41/0631 714/37 |
| 2016/0036652 | A1 * | 2/2016 | Bellini, III | H04L 41/5074 709/223 |
| 2017/0168884 | A1 * | 6/2017 | Bray | H04L 41/065 |
| 2018/0260760 | A1 * | 9/2018 | Srivastava | H04L 41/16 |
| 2018/0351783 | A1 * | 12/2018 | Patrich | H04L 41/0622 |
| 2018/0373578 | A1 * | 12/2018 | Bridges | G06N 20/00 |
| 2019/0081851 | A1 * | 3/2019 | Farrell | H04L 41/065 |
| 2019/0347282 | A1 * | 11/2019 | Cai | G06N 5/022 |
| 2020/0202302 | A1 * | 6/2020 | Rathod | G06F 18/23 |
| 2020/0204434 | A1 * | 6/2020 | Nitsch | H04L 41/5074 |
| 2020/0293946 | A1 * | 9/2020 | Sachan | G06Q 10/063112 |
| 2020/0374179 | A1 * | 11/2020 | Arrabolu | H04L 41/069 |
| 2021/0295237 | A1 * | 9/2021 | Taher | G06Q 10/063112 |
| 2022/0019496 | A1 | 1/2022 | Lozano | |
| 2022/0067295 | A1 | 3/2022 | Alikiaamiri | |
| 2022/0086060 | A1 * | 3/2022 | Tamir | H04L 41/5009 |
| 2022/0114041 | A1 * | 4/2022 | Tiwari | H04L 41/065 |
| 2022/0156138 | A1 * | 5/2022 | Hunter | G06F 11/0709 |
| 2022/0368586 | A1 * | 11/2022 | Stewart | H04L 41/0631 |
| 2023/0016199 | A1 * | 1/2023 | Jividen | H04L 41/5074 |
| 2024/0119386 | A1 * | 4/2024 | Kearns | G06Q 10/0635 |

OTHER PUBLICATIONS

Fournier-Viger, Philippe, et al. "Discovering alarm correlation rules for network fault management." International Conference on Service-Oriented Computing. Cham: Springer International Publishing, 2020. (Year: 2020).*

Herodotou, Herodotos, et al. "Scalable near real-time failure localization of data center networks." Proceedings of the 20th ACM SIGKDD international conference on Knowledge discovery and data mining. 2014. (Year: 2014).*

Han, Jianglei, Jing Li, and Aixin Sun. "Uftr: A unified framework for ticket routing." arXiv preprint arXiv:2003.00703 (2020). (Year: 2020).*

Disclosed Anonymously, "A Method to Enable Efficient Ticket Dispatch in an IT Service Environment," IP.com, Publication Date: Jul. 5, 2012, ip.com No. IPCOM000219524D (Year: 2012).*

Liu, Jinyang, et al. "Incident-aware duplicate ticket aggregation for cloud systems." 2023 IEEE/ACM 45th International Conference on Software Engineering (ICSE). IEEE, 2023. (Year: 2023).*

Zhao, Nengwen, et al. "Automatically and adaptively identifying severe alerts for online service systems." IEEE Infocom 2020—IEEE Conference on Computer Communications. IEEE, 2020. (Year: 2020).*

Chen, Junjie, et al. "How incidental are the incidents? characterizing and prioritizing incidents for large-scale online service systems." Proceedings of the 35th IEEE/ACM International Conference on Automated Software Engineering. 2020. (Year: 2020).*

Wang, Yaohui, et al. "Fast outage analysis of large-scale production clouds with service correlation mining." 2021 IEEE/ACM 43rd International Conference on Software Engineering (ICSE). IEEE, 2021. (Year: 2021).*

International Search Report and Written Opinion received for PCT Application No. PCT/US24/014905, May 10, 2024, 15 pages.

* cited by examiner

Incident Tickets Data Repository 204

302

304

| Ticket ID | Ticket Modified Time | Impact Start Time | Site | Create Date | Monitoring Service ID | Environment | Group ID | Hit Count | Impact Status | Incident Status | Severity | Title |
|---|---|---|---|---|---|---|---|---|---|---|---|---|
| 123 | T3 | T2 | Site 1 | T1 | Service1 | OE1 | Group1 | 31 | User | 500 | 2 | Title 1 |
| 124 | T5 | T4 | Site 2 | T2 | Service2 | OE1 | Group2 | 1 | User | 2 | 3 | Title 2 |
| ... | ... | ... | ... | ... | ... | ... | ... | ... | ... | ... | ... | ... |

FIG. 3

UTILIZING MONITORING SERVICE EXPLORATION TO IMPROVE SERVICE INCIDENT MITIGATION AND LOCALIZATION

BACKGROUND

Recent years have seen significant hardware and software advancements in computing devices, particularly in the area of cloud computing systems. Cloud computing systems provide vast and numerous services and applications to users. Occasionally, service incidents and outages occur that affect network systems and users. In many cases, despite employing a network of monitoring services and receiving reports of incidents and outages, existing systems poorly identify and mitigate these service incidents and outages. In various instances, these incidents and outages are too vague or sparsely populated to identify a problem or too noisy to be reliable. Additionally, the number of incidents and outages in these systems is often so numerous that most are often ignored. As a result, existing systems are slow to detect and mitigate service incidents and outages, even when these incidents and outages critically affect the services of a cloud computing system and impact users.

BRIEF DESCRIPTION OF THE DRAWINGS

The detailed description provides one or more implementations with additional specificity and detail through the use of the accompanying drawings, as briefly described below.

FIG. 3 illustrates an example table that is part of a service incident data repository in accordance with one or more implementations.

DETAILED DESCRIPTION

Figure 1:
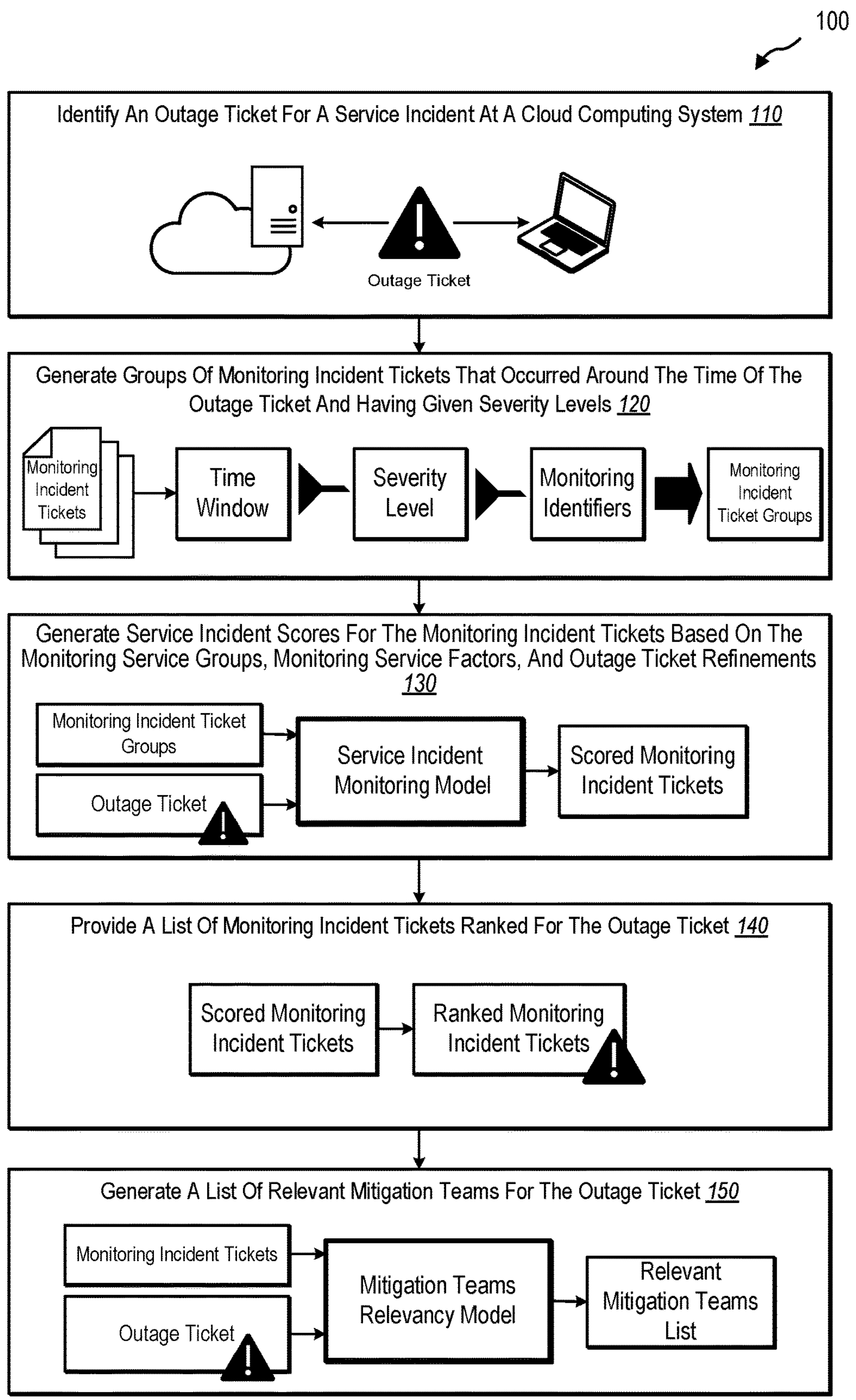
FIG. 1 illustrates an example overview for implementing the service incident resolution system in accordance with one or more implementations.

This disclosure describes utilizing a service incident resolution system to quickly, efficiently, and accurately determine and mitigate service incidents in a cloud computing system. For example, based on identifying an outage ticket (e.g., a customer-impacting incident ticket), the service incident resolution system identifies the additional context of the outage by detecting a number of monitoring signals that relate to the outage. For instance, the service incident resolution system utilizes various monitoring signals and service models to determine one or more monitoring signals that are relevant to the outage ticket by efficiently selecting relevant monitoring signals and filtering out noisy ones. In this way, vaguely reported service incidents having sparse information are supplemented with information-rich monitoring signals that allow for these outages to be quickly resolved. Additionally, in some instances, the service incident resolution system utilizes service-based models to efficiently localize an outage based on determining which mitigation services or relevant mitigation teams are well-equipped to quickly address a reported service incident.

For context, a cloud computing system provides a number of services and applications to users. Occasionally, a service incident (e.g. an outage) occurs that affects one or more users. In this disclosure, the term "service incident" (or "incident") refers to an unplanned interruption to a cloud service or application of a cloud computing system including service degradations, service interruptions, partial outages, and full outages. Similarly, the term "service outage" (or "outage") refers to one or more incidents that impact users (e.g., customer-impacting events). In some cases, an incident affects multiple services or applications of the cloud computing system.

When a service incident occurs, the outage is reported to the cloud computing system as part of an incident ticket (e.g., a support ticket). The term "incident ticket" refers to, among other things, a logged incident or set of incidents affecting cloud services or applications in the cloud computing system. Incident tickets can indicate various attributes and characteristics of an incident, such as an impact status, an outage status, a severity level, an incident time, a team identifier, a monitoring service identifier, one or more monitor signals, a title, a service environment, and a hit count (e.g., an incident count), among other information. In some instances, an incident ticket is called a service request or a support ticket. In this disclosure, incident tickets include outage tickets (e.g., user-impacting or customer-impacting incident tickets) and monitoring incident tickets (e.g., automatically triggered support tickets), which are both described further below.

As used, a "relevant mitigation team" refers to a system of devices and/or a collection of administrative users that are responsible for managing an area, portion, or function of the cloud computing system. In some instances, a relevant mitigation team corresponds to a team of one or more individuals, such as engineers, responsible for one or more services of the cloud computing system. In many implementations, a relevant mitigation team is assigned a team identifier. Additionally, in various implementations, one or more monitoring services are paired to a relevant mitigation team via a team identifier.

As mentioned above, implementations of the present disclosure solve one or more of the problems mentioned above as well as other problems in the art. Systems, computer-readable media, and methods utilize the service incident resolution system to determine, in real-time, monitoring signals and reports that relate to a given outage ticket (e.g., customer-impacting incident tickets), which facilitates improved mitigation of these issues. As further described below, the service incident resolution system may score monitoring requests and signals based on their relevance and importance to a given outage ticket. Additionally, in various instances, the service incident resolution system utilizes various techniques and models, such as natural-language processing, to better direct outage tickets to localities (e.g., teams, groups, or mitigation services) that are best outfitted to resolve the reported service incident.

To illustrate, in one or more implementations, the service incident resolution system receives an outage ticket, which reports a service incident that affects one or more users. In response, the service incident resolution system generates monitoring service groups by identifying monitoring incident tickets belonging to given monitoring services that occurred within a target time window of the outage ticket. Additionally, in various implementations, the service incident resolution system determines, for monitoring incident tickets in a given monitoring service group, an initial service incident score based on the elapsed times between the monitoring incident tickets and previously received monitoring incident tickets from the same monitoring service (e.g., based on the incident tickets having the same monitoring service identifier). The service incident resolution system also updates the initial service incident score for a monitoring incident ticket by weighting the initial service incident score based on monitoring service factors. Further, the service incident resolution system generates and provides a ranked list of relevant monitoring incident tickets corresponding to the outage ticket.

In additional implementations, the service incident resolution system supplements the ranked list of relevant monitoring incident tickets with one or more relevant mitigation teams (e.g., mitigation services or teams that work to resolve the outage). For example, in various implementations, the service incident resolution system generates a list of relevant mitigation teams for the outage ticket (and/or corresponding monitoring service identifiers) utilizing a teams relationship graph generated by a mitigation teams relevancy model and the outage ticket. Additionally, the service incident resolution system generates the list of relevant mitigation teams, for example, by correlating tokenized text from text fields of the outage ticket with relevant mitigation teams in the teams relationship graph.

As described herein, the service incident resolution system provides several technical benefits in terms of computing efficiency and accuracy compared to existing computing systems. Indeed, the service incident resolution system provides several practical applications that deliver benefits and solve problems associated with mitigating customer-impacting service incidents.

To illustrate the technical benefits of the service incident resolution system, briefly consider how existing systems suffer from significant inefficiencies and inaccuracies regarding mitigating service incidents within a cloud computing system. To elaborate, when an outage occurs to a cloud service (or application) within a cloud computing system, a large number of signals are reported to the cloud computing system as incidents tickets. Incident tickets from many sources, both external and internal, may report significant user impact at a given time. However, in many cases, these incident tickets are vague, sparce, and lack technical details. For example, an outage ticket may report that "Website xzy.com does not appear to be working" with little to no additional information. In addition to lacking technical details needed to address the service incident, many of these incident tickets also lack localization—the environment, group, team, or mitigation service to which the signal should be reported.

In addition to the incident tickets mentioned above, the cloud computing system also generates a large quantity of incident tickets that are created by a range of monitoring services. Often, these incident tickets often originate from unreliable and/or noisy monitoring services. Further, many of these latter incident tickets are not outages. In addition, customers can also manually submit incident tickets (e.g., support tickets) to the cloud computing system when issues arise. Commonly, these incident tickets obstruct and clog operations for mitigating service incidents within a cloud computing system.

Further, many signals are noisy and/or are reported with a low urgency or severity rating. As a result, existing systems (and/or designated responsible individuals (DRIs)) generally ignore a large portion of incident tickets as manual exploration and filtering of outage tickets in real-time is unpracticable, and often results in inefficient errors. Indeed, existing systems commonly ignore or miss valuable signals, which delays or prevents effectively mitigating service incidents.

When considered, existing systems also regularly assess an outage ticket as a false positive due to the lack of information associated with the signal. This then leads to an incident tickets being provided to the wrong locality (e.g., team or mitigating service) or being falsely marked as resolved or mitigated, which further delays mitigation. Moreover, existing systems often rely heavily on manual intervention. For example, many existing systems need a user (e.g., an administrator user such as a DRI) to classify an incident ticket. In these instances, the user may mark the incident ticket as a false positive due to lack of information, lack of investigation time, lack of ability, etc. These and other manual errors often result in falsely marking incident tickets, which also delays mitigation.

In contrast, the service incident resolution system resolves these and other problems with existing systems. To illustrate, by generating and utilizing one or more service models, the service incident resolution system more quickly and accurately mitigates outage tickets, even if vague, sparce, or numerous, by determining incident tickets that are reliable and relevant to a detected user-impacting outage. For example, cloud computing systems often have a large pool of monitoring sensors, services, and devices that identify and report signals and alerts, in the form of monitoring incident tickets, when various conditions are triggered within the cloud computing system. These monitoring incident tickets often include helpful network information that is necessary to identify the causes of service incidents. However, these monitoring incident tickets are not tied to outage tickets. Accordingly, the service incident resolution system utilizes service models, such as a service incident monitoring model, to partner relevant monitoring incident tickets and their monitoring signals with outage tickets.

Indeed, by utilizing service models, such as a service incident monitoring model, the service incident resolution system improves efficiency and accuracy over existing systems by determining service incident scores (e.g., importance or relevance scores), which accurately correlate a given outage ticket to monitoring incident tickets and signals. In this manner, even vague outage tickets can be addressed with detailed and valuable system information from corresponding monitoring incident tickets.

As another example, the service incident resolution system utilizes service incident scores to filter out noisy outage signals as well as vague outage signals that do not include enough information to be useful by themselves. In particular, the service incident resolution system utilizes the service incident monitoring model to determine service incident scores for monitoring incident tickets, filter out less relevant requests, and rank the requests that are more important to the outage ticket, which results in the important monitoring incident tickets being considered and noisy requests and signals being minimized.

Similarly, by generating and refining service incident scores, the service incident resolution system is able to consider monitoring incident tickets that existing systems otherwise ignore or overlook. For instance, while monitoring incident tickets with mid- and lower-critical level severity scores are frequently ignored by existing systems, the service incident resolution system is able to utilize these monitoring incident tickets in a targeted manner to improve accuracy as well as quickly detect the cause of outages. This also leads to lowering the number of incoming incident tickets (e.g., less monitor services are reporting issues and/or less customer are submitting incident tickets), as problems are resolved more quickly, as well as reducing the number of incident tickets marked as false alarms, as the service incident resolution system is able to validate incident tickets based on support (or lack thereof) from monitoring incident tickets.

As another benefit, by correlating monitoring incident tickets to given outage tickets based on the service incident scores, the service incident resolution system more accurately determines how to mitigate the service incident request. For instance, by knowing which monitoring incident tickets correspond to an outage ticket, the service incident resolution system is better able to direct the issue to the appropriate locality (e.g., mitigation service or team). This improvement in group localization, in turn, results in faster mitigation times and quicker resolutions. Efficiencies further improve by not sending outage issues to the wrong team where the issues are not addressed and/or where more manual mistakes are often made that degrade the effectiveness of the cloud computing system.

As an additional benefit, the components used by the service incident resolution system, such as the service incident monitoring model and the mitigation teams relevancy model provide improved flexibility over existing systems. For example, the service incident resolution system requires fewer inputs and operates in real-time or near-real time. Additionally, because of its ingenuity, the service incident resolution system easily scales to a wide range of services and applications.

As illustrated in the foregoing discussion, this disclosure utilizes a variety of terms to describe the features and advantages of one or more implementations described. To illustrate, this disclosure describes a service incident resolution system in the context of a cloud computing system. As an example, the term "cloud computing system" refers to a network of connected computing devices that provide various services and applications to computing devices (e.g., server devices and client devices) inside or outside of the cloud computing system. Additional terms are defined throughout the document in different examples and contexts.

Additional details in connection with an example implementation of the service incident resolution system are discussed in connection with the following figures. For example, FIG. 1 illustrates an example overview for implementing the service incident resolution system in accordance with one or more implementations. As shown, FIG. 1 illustrates a series of acts 100, which, in many instances, is performed by the service incident resolution system with respect to a cloud computing system.

In some instances, when an outage occurs, a device from the cloud computing system or an external device generates an outage ticket and provides it to the cloud computing system. In response, the service incident resolution system detects or receives the outage ticket. To illustrate, FIG. 1 shows that the series of acts 100 includes an act 110 of identifying an outage ticket for a service incident at a cloud computing system.

As mentioned above, the service incident resolution system receives outage tickets indicating outages that affect one or more services and one or more users. For example, an external service indicates an issue with one of the services provided by the cloud computing system. However, most outage tickets are too vague and lack the necessary technical background information needed to efficiently identify or address the outage. In some implementations, an outage ticket includes inaccurate information, especially when the outage tickets are directly generated by users. Further, the problem is amplified as the number of indefinite outage tickets continues to be reported to the cloud computing system.

In this disclosure, the term "outage ticket" refers to an incident ticket that directly or indirectly affects a user (e.g., a user-impacting incident ticket). In various cases, the service incident resolution system generates an outage ticket based on a user reporting an incident or outage with a cloud service or application of the cloud computing system. As another example, in response to user interactions, a third-party service, such as a down-detector website or service, provides the service incident resolution system with an outage ticket in response to user interactions. An example of outage tickets is provided below in connection with FIG. 3.

Because the outage ticket corresponds to an outage within the cloud computing system but often lacks the information and technical details needed to resolve the issue or direct the issue to the correct relevant mitigation teams (e.g., a team of users or mitigation service), the service incident resolution system intelligently draws in other resources to pinpoint the root of the outage to facilitate a quick, efficient, and accurate resolution. To illustrate, as shown in FIG. 1, the series of acts 100 includes an act 120 of generating groups of monitoring incident tickets that occurred around the time of the outage ticket and that have given severity levels.

In many implementations, the service incident resolution system is able to draw information from a number of additional incident tickets and their signals captured by monitoring services of the cloud computing system. Indeed, the cloud computing system includes a number of monitoring services that provide monitoring incident tickets. The term "monitoring service" refers to a service that monitors signals (e.g., metrics) for the occurrence of one or more service alerts. Generally, a monitoring service is identified by a monitoring service identifier. In various implementations, a monitoring service is located on a computing device or as its own device. In various implementations, when a monitoring service raises a service alert based on detecting a predetermined condition being satisfied, the monitoring service generates a monitoring incident ticket (e.g., monitor-based support ticket).

Additionally, the term "signal" refers to a service signal that provides a measurable metric corresponding to a network appliance or service within a cloud computing system. For example, a signal includes data created in the course of normal operations of a service. Further, a signal includes data provided to report the status of a given cloud service or appliance of the cloud computing system. A signal may also refer to a monitoring signal, which is a service signal provided by a monitoring service.

Along these lines, the term "monitoring incident ticket" refers to an incident ticket corresponding to a monitor service or monitoring service. In many instances, a monitoring service automatically generates a monitoring incident ticket based on one or more signals causing service alerts at the monitor service. Additionally, a "service alert" (or "alert") is when a signal satisfies (e.g., triggers, meets, reaches, exceeds) a monitoring service threshold (e.g., a condition, value, limit, rule). For example, a monitoring service monitors a set of signals against a set of thresholds. When any of the thresholds are reached, the monitoring service generates an alert. The alert can be included in an incident ticket generated by the monitoring service.

Because the cloud computing system often includes a large number of monitoring services that generate monitoring incident tickets, in order to be able to use the monitoring signals to help resolve the reported outage in a given outage ticket, the service incident resolution system needs to intelligently narrow down the monitoring signals to those that correspond to the given outage ticket. Accordingly, as mentioned above, the series of acts 100 includes the act 120 of generating groups of monitoring incident tickets that occurred around the time of the outage ticket and that have given severity levels.

In various implementations, the service incident resolution system initially filters monitoring incident tickets. For example, the service incident resolution system accesses a data repository of monitoring incident tickets and identifies monitoring incident tickets that occurred within a time window of the given outage ticket. In one or more implementations, the service incident resolution system further filters the monitoring incident ticket based on other attributes and characteristics. For instance, the service incident resolution system includes any remaining monitoring incident tickets that have one or more target severity levels. In addition, in various implementations, the service incident resolution system groups the filtered monitoring incident tickets by relevant mitigation teams. As mentioned above, in various implementations, incident tickets are associated with relevant mitigation teams.

Accordingly, in one or more implementations, the service incident resolution system generates one or more monitoring service identifier groups that cluster filtered monitoring incident tickets that have the same relevant mitigation teams (or a set of related relevant mitigation teams). Indeed, the service incident resolution system can generate multiple monitoring incident tickets groups based on grouping the filtered monitoring incident tickets by different monitoring service identifiers. Additional details regarding generating, preparing, and initially filtering monitoring incident tickets are provided in connection with FIG. 4 below.

Upon sorting monitoring incident tickets into groups based on monitoring service identifiers, the service incident resolution system can utilize a service incident monitoring model to determine salient correlations between the grouped and filtered monitoring incident tickets and the given outage ticket. To illustrate, FIG. 1 shows that the series of acts 100 includes an act 130 of generating service incident scores for the monitoring incident ticket based on the monitoring service groups, monitoring service factors, and outage ticket refinements.

As used, the term "service incident score" refers to a metric that indicates a correlation or relevancy between two incident tickets. For example, a service incident score signals how relevant or important a monitoring incident ticket is to an outage ticket. For example, a service incident monitoring model generates a service incident score for one or more monitoring incident tickets (e.g., within a monitoring service group) to a monitoring service (e.g., represented by a monitoring service identifier). Further, the term "monitoring service factors" refers to metrics utilized to improve a service incident score. For example, the service incident resolution system utilizes monitoring service factors to weight an initial version of a service incident score and generate an updated version of the service incident score, which better signifies the correlation of a monitoring incident ticket to a given outage ticket.

As shown, the service incident resolution system utilizes the service incident monitoring model to generate scored monitoring incident tickets that indicate a correlation or importance between the outage ticket and each of the filtered monitoring incident tickets. For example, the service incident monitoring model determines correlations by generating an initial service incident score based on monitoring service groups, such as comparing current message requests to prior incident tickets.

In addition, in various implementations, the service incident monitoring model refines the initial service incident scores on monitoring service factors, such as a threshold reached count (e.g., hit count), a distinct monitoring incident ticket count, and time direction among others. Further, in several implementations, the service incident monitoring model refines the service incident scores based on attributes of the given outage ticket. Additional details regarding generating, updating, and refining service incident scores to indicate important correlations between the outage tickets and monitoring incident tickets are provided below in connection with FIG. 5.

As shown, the series of acts 100 includes an act 140 of providing a list of monitoring incident tickets ranked for the given outage ticket. In various implementations, the service incident resolution system ranks the top-scoring monitoring incident ticket to indicate the strongest correlations with the given outage ticket. In this manner, the ranked list of outage tickets ties the outage ticket to specific monitoring incident tickets, which, in turn, reveal much more specific and useful information regarding the outage vaguely reported in the given outage ticket.

Additionally, as shown in FIG. 1, the series of acts 100 includes an act 150 of generating a list of relevant mitigation teams for the outage ticket. In various implementations, the service incident resolution system determines relevant mitigation teams lists for the outage ticket based on previous outage tickets and/or monitoring incident tickets. For example, for one of the monitoring incident tickets in the ranked list for the outage ticket, the service incident resolution system utilizes a mitigation teams relevancy model to determine correlations to one or more relevant mitigation teams. As provided below, the service incident resolution system may utilize relationship graphs, token comparisons, and natural-language processing to generate a list of relevant mitigation teams that correspond to an outage ticket. Additional details regarding the generation of relevant mitigation teams lists are provided below in connection with FIG. 6.

Figure 2:
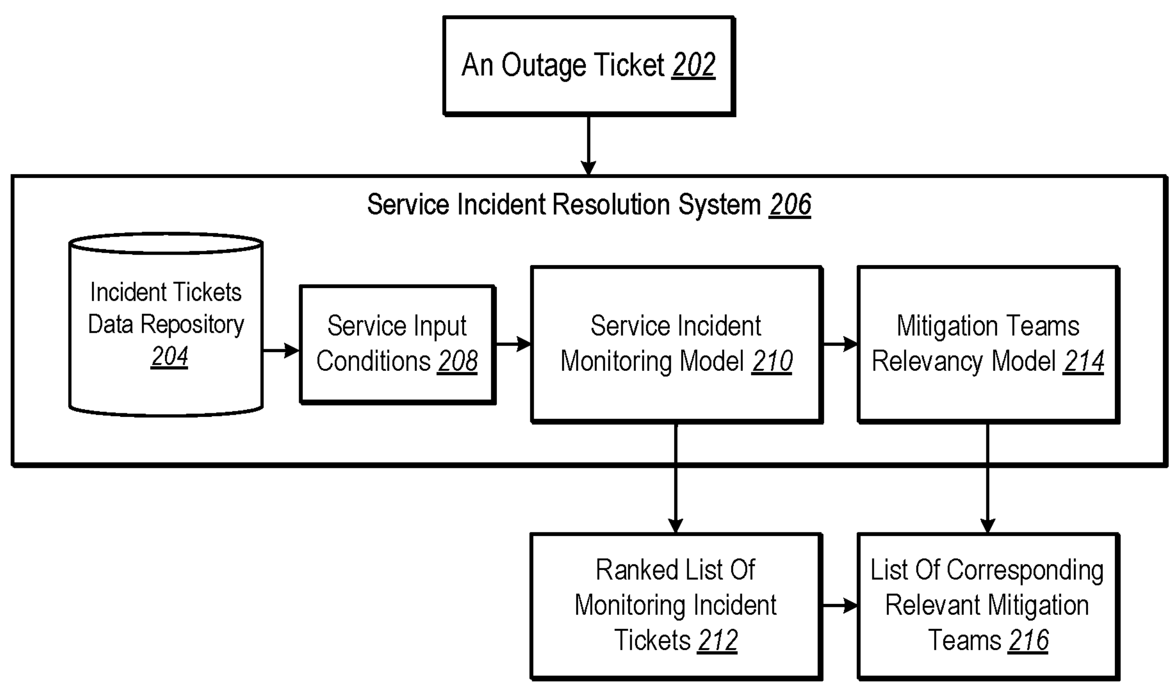
FIG. 2 illustrates an example process flow diagram of utilizing the service incident resolution system to determine a list of monitoring incident tickets and a list of corresponding relevant mitigation teams in accordance with one or more implementations.

With a general overview of the service incident resolution system in place, additional details are provided regarding operations and features of the service incident resolution system. To illustrate, FIG. 2 provides an example diagram of the service incident resolution system. In particular, FIG. 2 illustrates an example diagram of utilizing the service incident resolution system to determine a list of monitoring identifiers and a list of corresponding relevant mitigation teams in accordance with one or more implementations. As illustrated, FIG. 2 shows the service incident resolution system 206 generating a ranked list of monitoring incident tickets 212 based on an outage ticket 202. In some embodiments, the service incident resolution system 206 further generates a list of corresponding relevant mitigation teams 216 based on an outage ticket 202.

As shown in FIG. 2, the service incident resolution system 206 receives the outage ticket 202. As mentioned above, an outage ticket corresponds to an outage of a cloud computing system (e.g., with a service, network appliance, or application) of that affects users. For example, the outage could be related to a feature of a service that is not working or a service that has gone offline. The outages could range from an outage for a single user, to a regional outage, to a global outage.

Additionally, the service incident resolution system 206 can receive the outage ticket 202 from a variety of sources. Depending on the type of outage, the service incident resolution system 206 may receive multiple related outage tickets from the same or different sources. For example, the outage is reported by an external service, such as a down detection service where users report a potentially downed service or a social media site, or a user feedback service. For instance, a monitoring service on a social media site parses user posts to identify references to the cloud computing system, analyzes these posts to determine when the posts include information indicating an outage of the cloud computing system, generates incident tickets for the indicated outage, and sends the incident ticket to the cloud computing system. In another example, a service internal to the cloud computing system, such as a user feedback service where users generate and submit incident tickets.

In response to identifying a given outage ticket, the service incident resolution system 206 intelligently and dynamically generates the ranked list of monitoring incident tickets 212 that identifies monitor signals from monitoring services that closely correlate to the outage ticket 202. In this manner, the service incident resolution system 206 is able to correlate monitoring signals from monitoring incident tickets with the outage ticket 202 to more quickly and accurately resolve the corresponding outage.

Additionally, as shown, the outage ticket 202 optionally generates the list of corresponding relevant mitigation teams 216. In this manner, the service incident resolution system 206 is able to correctly provide the outage ticket 202 and corresponding monitoring incident tickets to the relevant mitigation teams that are best suited to quickly mitigate and/or fix the corresponding outage.

As shown, the service incident resolution system 206 includes an incident tickets data repository 204, service input conditions 208, a service incident monitoring model 210, and a mitigation teams relevancy model 214, which may be optional in some implementations. These components in the service incident resolution system 206 are described in further detail in FIGS. 3-6. For example, FIG. 3 further describes the incident tickets data repository 204, FIG. 4 further describes the service input conditions 208, FIG. 5 further describes the service incident monitoring model 210, and FIG. 6 further describes the mitigation teams relevancy model 214. While various features are described with respect to particular components, different components may perform one or more of the features described in connection with another component. Each of these is described next in connection with FIGS. 3-6, where FIG. 2 serves as a high-level overview of the process.

To illustrate, FIG. 3 shows an example of an incident tickets data repository 204 included in FIG. 2. As mentioned, the incident tickets data repository 204 may represent a data repository of support tickets. In various implementations, the incident tickets data repository 204 is a table, store, data source, or other data structure that houses incident tickets, including outage tickets and monitoring incident tickets. In some implementations, the incident tickets data repository 204 includes new incident tickets, pending incident tickets, completed incident tickets, and/or archived incident tickets. In alternative implementations, the incident tickets data repository 204 represents multiple tables or data repositories of incident tickets.

As shown in FIG. 3, the incident tickets data repository 204 in FIG. 3 includes various data fields 302 that correspond to different attributes, qualities, and characteristics of incident tickets 304. While example various data fields 302 are shown in the incident tickets data repository 204, additional or different data fields and information are possible.

For this example, the incident tickets 304 show various monitoring incident tickets that include several pieces of information collected and/or reported by one or more monitoring services. In some implementations, the incident tickets 304 includes outage tickets, which may include less information (e.g., missing or incomplete data fields). Additionally, the incident tickets 304 may include other types of incident tickets.

In various implementations, such as shown in the incident tickets data repository 204 the various data fields 302 include various time and date fields. For example, the various data fields 302 include a ticket identifier (e.g., service request identifier), a create date, an impact start time (if available), and a ticket modified time corresponding to timestamps of different events with respect to a given incident ticket. The various data fields 302 may also include additional fields, such as a site or service that alerted the cloud computing system of the outage and/or a site or service affected by the outage, an identifier of a monitoring service that provided an incident ticket, a relevant mitigation teams that to which the request is assigned (or is to be assigned), one or more environments (e.g., occurring environments or raising environment) where the outage is occurring or affecting, a hit count (e.g., an alert court, incident count, or request count), a user impact status indicating whether the incident ticket is user-impacting, an incident status (e.g., whether an incident is a user-impacting outage), a severity level, and/or a title.

As mentioned, in some implementations, the various data fields 302 include a hit count. For example, an incident ticket can be updated as corresponding incident tickets are received. For example, if the same monitoring service provides multiple incident tickets for a particular incident (e.g., an initial incident ticket followed by updated incident tickets), the incident tickets data repository 204 updates the corresponding incident ticket by adding new information to the entry and/or incrementing the hit count. As shown, the first monitoring incident ticket includes 31 counts and the second monitoring incident ticket includes a single count. Additional details regarding various data fields 302 will be provided below throughout this disclosure.

In various implementations, the service incident resolution system 206 accesses incident tickets (e.g., monitoring incident tickets) for the incident tickets data repository 204 in response to receiving the outage ticket 202. In this manner, the service incident resolution system 206 can initiate the process of discovering one or more monitoring incident tickets that correspond to the outage ticket 202. This concept, which was introduced in FIG. 2 is further described next in FIG. 4.

Figure 4:
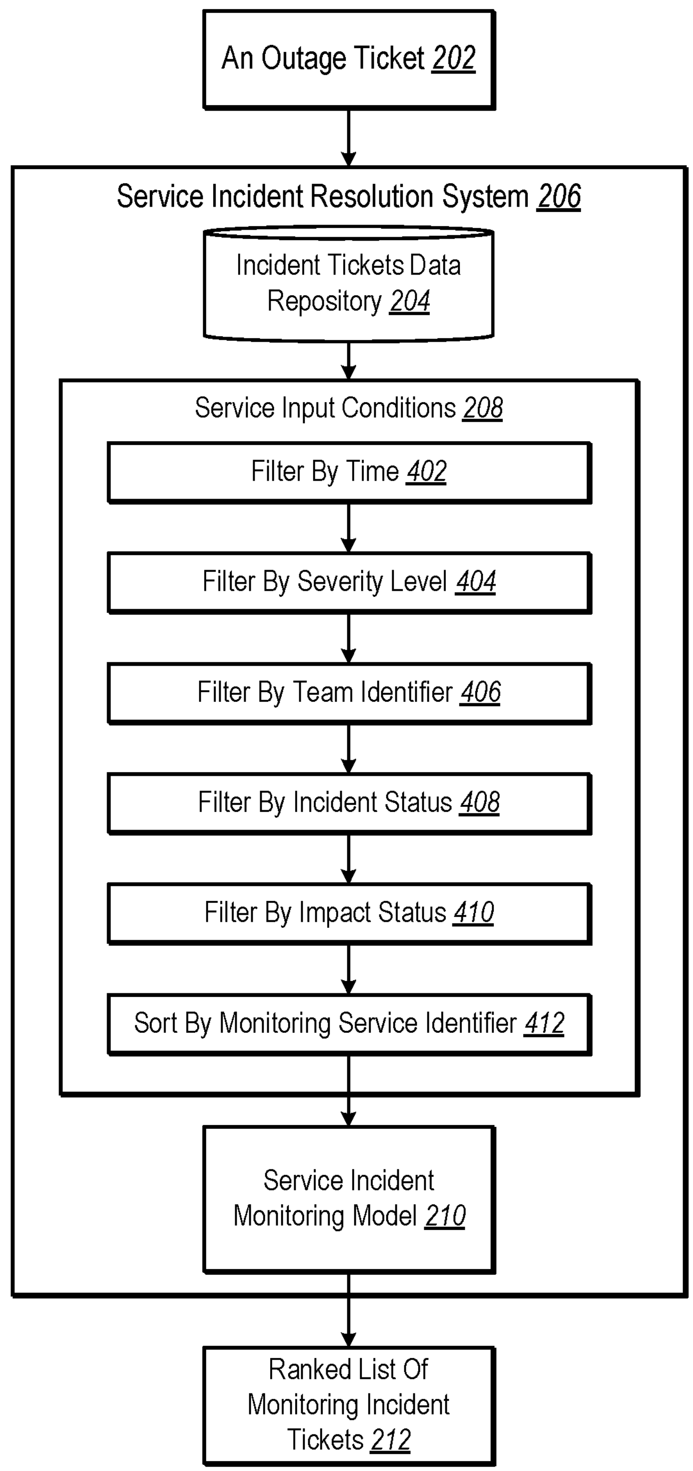
FIG. 4 illustrates an example process flow for applying service input conditions to incident tickets corresponding to an outage ticket in accordance with one or more implementations.

To illustrate, FIG. 4 shows an example of applying service input conditions to incident tickets corresponding to an outage ticket in accordance with one or more implementations. FIG. 4 includes many of the components shown in FIG. 2; however, the service input conditions 208 have been expanded to include example acts. Indeed, FIG. 4 provides additional details regarding accessing the incident tickets data repository 204 to identify an initial set of monitoring incident tickets based on service input conditions 208, which are provided to the service incident monitoring model 210 for further processing to generate a ranked list of monitoring incident tickets 212. While the service input conditions 208 include a number of acts, the service incident resolution system 206 can add, omit, skip, and/or reorder the acts shown in the service input conditions 208.

In general, the service incident resolution system 206 applies one or more sets of conditions, rules, and/or thresholds from the service input conditions 208 to incident tickets stored in the incident tickets data repository 204 to provide to the service incident monitoring model 210. For example, the service incident resolution system 206 utilizes a first set of conditions to generate a first set of incident tickets that serve as candidate requests that are important to the outage ticket 202 (e.g., the given outage ticket). As another example, the service incident resolution system 206 identifies a second set of incident tickets to help evaluate the first set (e.g., as a baseline or reference). Further, the service incident resolution system 206 can generate additional sets or subsets of incident tickets.

As shown, the service input conditions 208 includes an act 402 of filtering monitoring incident tickets from the incident tickets data repository 204 by time (and/or date). For instance, the service incident resolution system 206 generates a first set of incident tickets by identifying one or more monitoring incident tickets that occur within a time period of the outage ticket 202. For example, based on a timestamp of the outage ticket 202, the service incident resolution system 206 filters in (e.g., identifies, selects) requests that occur within a time window, e.g., 30 mins (or another time window such as 15 seconds, 1 minute, 5 minutes, 1 hour, 1 day, 1 month, etc.) of the outage ticket 202. Often, the monitoring service generates several monitoring incident tickets for the same incident or outage event. As another example, the service incident resolution system 206 generates a second set of requests based on monitoring incident tickets within a second time window, such as 1-2 years. In some of these implementations, the second set excludes requests in the first set and/or does not overlap with the first set.

In some implementations, the service incident resolution system 206 filters by severity level, as shown by the act 404 within the service input conditions 208. For instance, the service incident resolution system 206 filters out requests from the first set and/or the second set that have a severity level above (or below) a threshold severity amount. For example, the service incident resolution system 206 removes requests from the first set that have a level 4 severity level (e.g., on a scale of 0-4, where 0 is a global outage, 4 is a local incident—or based on another scale). Stated differently, in some instances, the service incident resolution system 206 keeps requests in the first set that satisfy a severity level threshold of 3 or less.

Further, as shown, the service input conditions 208 include an act 406 of sorting by team identifier. For example, in various implementations, the service incident resolution system 206 organizes the first set and/or the second set by team historical relevancy with respect to the corresponding monitoring incident tickets. For instance, in one or more implementations, the service incident resolution system 206 organizes the first set and/or the second set by mitigation teams included in the corresponding monitoring incident tickets. In some implementations, the service incident resolution system 206 forms a new grouping by mitigation teams or further groups and/or sorts existing groups (e.g., monitoring service groups) within a set of mitigation teams.

Additionally, the service incident resolution system 206 can further filter sets of incident tickets. For example, as shown, the service input conditions 208 include an act 408 of filtering by incident status. For instance, the service incident resolution system 206 filters the first set and/or the second set of monitoring incident tickets based on the incident status indicated by their incident tickets. For example, the service incident resolution system 206 selects incident tickets that are indicated as outages (e.g., user-impacting) and/or filters out non-user-impacting incident tickets. In some implementations, the incident status indicates a number or range of users that are impacted or estimated to be impacted. In some instances, the service incident resolution system 206 filters based on a number of impacted users meeting an incident/outage threshold. In some implementations, the service incident resolution system 206 filter by incident source type, such as if an incident ticket was opened by a monitoring service, a user, or manually by an administrator.

In one or more implementations, the service incident resolution system 206 continues to filter, refine, and group incident ticket sets by applying additional conditions. To illustrate, the service input conditions 208 include an act 410 of filtering by impact status. For instance, the service incident resolution system 206 filters the first set and/or the second set based on outages that impact users (e.g., customer-impacting outages) as indicated by the outage status of an incident ticket.

As noted above, many existing systems ignore less critical incident tickets because of the volume of incoming requests and/or the lack of information from a request. However, when multiple incident tickets are pooled and filtered, the service incident resolution system 206 is able to accurately remove noisy requests and fill in missing information gaps. In this way, the service incident resolution system 206 leverages monitoring incident tickets that existing systems or otherwise ignore or discard and which can become larger outages if not quickly addressed.

Additionally, as shown, the service input conditions 208 include an act 412 of sorting by monitoring service identifiers. For example, in various implementations, the service incident resolution system 206 organizes the first set and/or the second set by monitoring service identifiers included in the corresponding monitoring incident tickets. In many implementations, the service incident resolution system 206 generates monitoring service identifier groups (or monitoring service groups) where each monitoring incident ticket in a monitoring service group shares the same monitoring service identifier (or range or set of monitoring service identifiers). For instance, the first set of incident tickets includes multiple monitoring service groups (e.g., subsets).

Upon accessing and generating incident ticket sets based on applying one or more of the service input conditions 208, the service incident resolution system 206 provides the one or more sets of incident tickets to the service incident monitoring model 210. As mentioned in FIG. 2 above, the service incident monitoring model 210 generates a ranked list of monitoring incident tickets 212 from incident tickets that correlate and are important to the outage ticket 202. Additional details regarding operations and features of the service incident monitoring model 210 are provided next in connection with FIG. 5.

Figure 5:
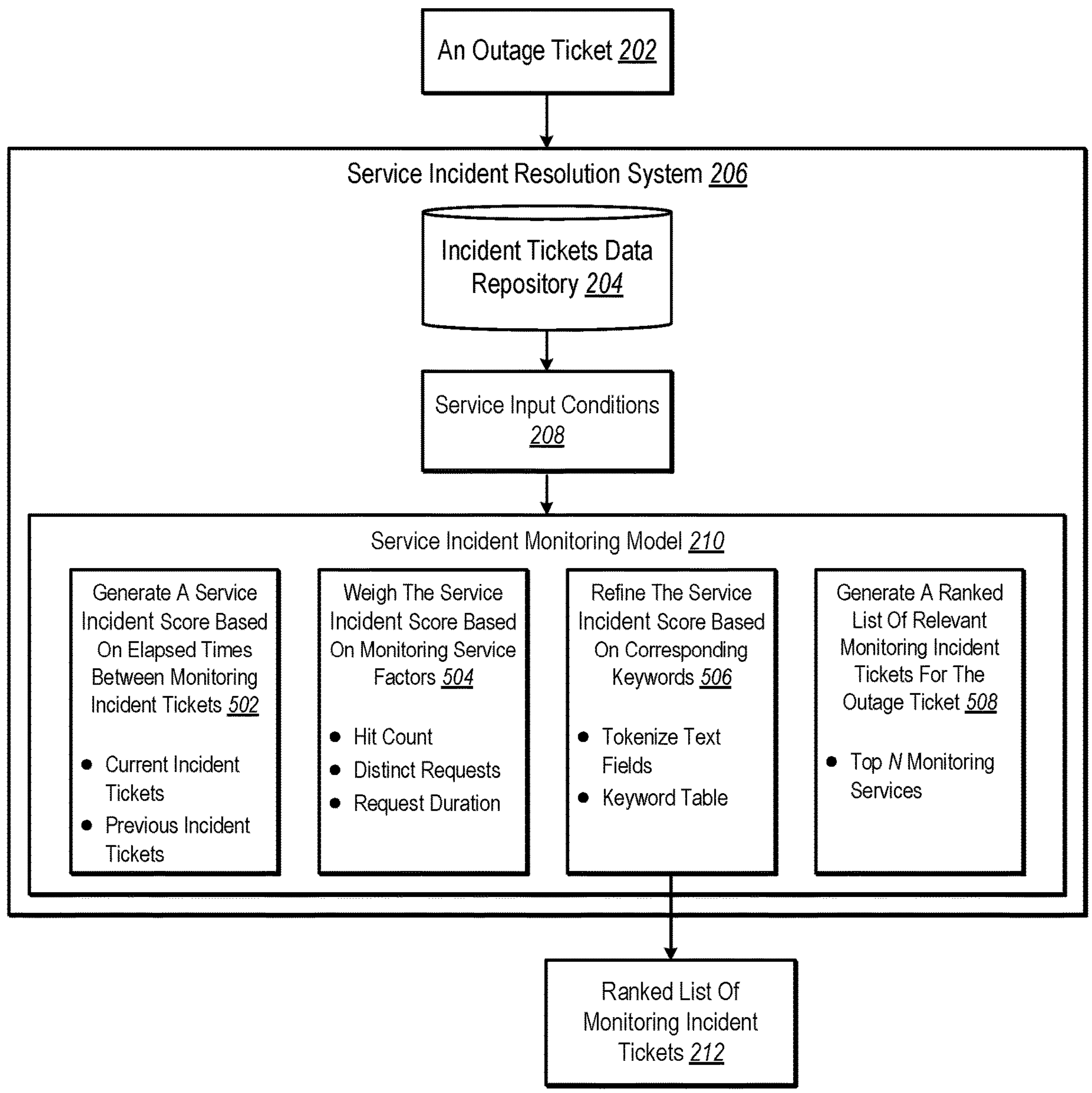
FIG. 5 illustrates an example process flow for utilizing the service incident monitoring model to generate a ranked list of relevant monitoring incident tickets corresponding to the outage ticket in accordance with one or more implementations.

As shown, FIG. 5 illustrates an example of utilizing the service incident monitoring model to generate a ranked list of relevant monitoring incident tickets corresponding to the outage ticket in accordance with one or more implementations. FIG. 5 also includes many of the components shown in FIG. 2 with the service incident monitoring model 210 expanded to include example acts.

As shown in FIG. 5, the service incident resolution system 206 provides outputs from the service input conditions 208 to the service incident monitoring model 210. For example, the service incident resolution system 206 provides one or more of the incident ticket sets determined by the service input conditions 208 to the service incident monitoring model 210 to generate the ranked list of monitoring incident tickets 212.

To elaborate, the service incident monitoring model 210 in FIG. 5 includes an act 502 of generating a service incident score based on elapsed times between incident tickets. In one or more implementations, the service incident resolution system 206 determines a service incident score for each of the monitoring incident tickets in a set of monitoring incident tickets based on comparing the requests in a different set. For example, the service incident resolution system 206 determines the median duration of previous incident tickets (e.g., previous tickets) for each of the monitoring service groups.

To illustrate, in various implementations, the service input conditions 208 creates a first set of monitoring incident tickets that occur within a first time window corresponding to the occurrence of the outage ticket 202, are user-impacting, resulting in an outage, and meet or exceed a given severity threshold, as described above. Additionally, the first set is grouped into monitoring service groups. Further, the service input conditions 208 create a second set of monitoring incident tickets that are similar to the first set and grouped into monitoring service groups, but that forms a second time window occurring before the first time window and for a longer duration. In other words, the first and second sets include similar incident tickets that are grouped similarly, but the first set includes monitoring incident tickets that occur around the time of the outage ticket 202 and the second set includes older, previous requests.

Additionally, in various implementations, the service incident resolution system 206 determines service incident scores for incident tickets in the first set based on incident tickets in the second set. For example, the service incident resolution system 206 determines a service incident score for each monitoring service group in the first set by comparing them to previous incident tickets, which, in some instances, includes corresponding incident tickets in the second set of previous incident tickets (e.g., from the same monitoring service group). In other instances, the service incident resolution system 206 determines a service incident score for each monitoring service group in the first set by comparing each request to its previous incident tickets in the monitoring service group.

In various implementations, the service incident resolution system 206 computes the service incident score based on the median duration between incident tickets of a given monitoring service group over a period of time. For example, the service incident resolution system 206 identifies incident tickets of the monitoring service group within a time window (e.g., 100 days, 300 days, 700 days, 1000 days). For each of these incident tickets (e.g., a given incident ticket), the service incident resolution system 206 determines a time duration between the timestamp of the given incident ticket and the timestamp of the previous (or next) incident ticket in the monitoring service group. The service incident resolution system 206 then determines the median (e.g., average) duration between the sets of consecutive incident tickets. In this manner, the service incident resolution system 206 determines an accurate measure of the reliability and/or noisiness of the monitoring service associated with the monitoring service group.

Based on the median duration for the monitoring service group, in various instances, the service incident resolution system 206 determines a service incident score for the monitoring service group. In various implementations, the service incident resolution system 206 assigns the service incident score (e.g., based on the median duration) as an initial service incident score to each of the incident tickets in the given monitoring service group. In this way, the incident tickets in each monitoring service group in the first set are assigned with the service incident score determined for the group in which they are included.

By way of context, the initial service incident scores are determined based on the monitoring service group and are further determined based on the accuracy and reliability of the monitoring service that generated the incident ticket. For example, if a monitoring service generates an incident ticket at a rate of two-per-week and then generates eight incident tickets within the past ten minutes, the service incident resolution system 206 utilizes the service incident monitoring model 210 to determine the initial importance (e.g., service incident score) of those eight recently reported requests. In many instances, the service incident resolution system 206 determines a service incident score for the monitoring service based on whether the monitoring service is exhibiting typical behavior. In some cases, if the service incident resolution system 206 determines a monitoring service to be noisy, sporadic, or atypical, the service incident resolution system 206 determines a lower (e.g., less favorable) initial service incident score for incident tickets that it generates.

In various implementations, the service incident resolution system 206 generates and/or utilizes a machine-learning model to determine the reliability and/or noisiness of the monitoring service corresponding to a monitoring service group. For example, a service incident machine-learning model determines a service incident score for a given monitoring service based, at least in part, on comparing relationships between previous incident tickets corresponding to the given monitoring service. Similarly, the service incident resolution system 206 may use another model to approach to determine the median duration between consecutive triggers to assess the noisiness/reliability of a monitoring service as part of performing the act 502.

Upon generating service incident scores (e.g., initial service incident scores), the service incident monitoring model 210 can begin to individualize, adjust, and/or update the service incident score for the incident tickets in the first set. For example, the service incident resolution system 206 builds a weighted service incident score (e.g., importance score) for incident tickets in the first set of incident tickets.

To illustrate, the service incident monitoring model 210 includes an act 504 of weighing the service incident score based on monitoring service factors. For example, the service incident resolution system 206 adjusts the initial service incident score of each incident ticket based on its attributes, characteristics, and qualities. Indeed, in various implementations, the service incident resolution system 206 adjusts the initial service incident scores by applying one or more weights based on the monitoring service factors to generate updated service incident scores, as provided below.

As mentioned above, the act 504 includes weighing the service incident score based on monitoring service factors. Examples of monitoring service factors include hit count (e.g., reached threshold counts), distinct number of incident tickets, incident ticket durations, and/or other factors. In this manner, the service incident resolution system 206 utilizes the service incident monitoring model 210 to increase or decrease the service incident score for each incident ticket from their assigned initial service incident score.

In various implementations, the threshold reached count (e.g., a hit count) includes the number of times signals in a given monitoring incident ticket have reached a critical threshold for the given monitoring service identifier. Further, as mentioned above, a monitoring service determines an alert when a signal reaches one or more correlation rules or thresholds. Each of these alerts may contribute to the threshold reached count for the incident ticket. Additionally, as additional alerts are created, the threshold reached count for the incident ticket can be updated (e.g., in real-time or periodically). In various implementations, alerts from the same cluster of monitoring devices are grouped together to an incident ticket. Moreover, in many instances, the service incident resolution system 206 increases the service incident score of an incident ticket as the number of threshold reached counts increase (or vice versa).

In one or more implementations, the distinct monitoring incident ticket count includes the number of distinct monitoring services that provide monitoring signals to an incident ticket. For example, multiple instances of the same monitor may be in different locations and separately detect and respond to alerts, but the service incident resolution system 206 may store information received from these different monitoring services in the same incident ticket. In another example, the service incident resolution system 206 groups similar monitoring services to the same incident ticket. Accordingly, the service incident resolution system 206 may track the number of distinct monitoring services contributed to an incident ticket and, in some instances, increase (or decrease) the service incident score based on the number of different reporting monitoring services.

In certain implementations, the service incident resolution system 206 generates (or otherwise uses) a machine-learning model to perform the act 504. For instance, using labeled information and feedback, the service incident resolution system 206 generates a classifier or machine-learning model to adjust initial service incident scores and generate updated service incident scores for each of the incident tickets in the first set.

As shown, the service incident monitoring model 210 includes an act 506 of refining the service incident score based on corresponding keywords. In various implementations, the service incident resolution system 206 refines the updated service incident scores based on correlations to the outage ticket 202. For example, the service incident resolution system 206 refines the service incident scores based on correlating incident tickets to content within the outage ticket 202.

To illustrate, in various implementations, the service incident resolution system 206 causes the service incident monitoring model 210 to tokenize words within the text fields (e.g., data fields) of an incident ticket, such as from its title, environment, site, etc. Additionally, in various instances, the service incident resolution system 206 generates or accesses a keyword table, which may include keywords based on the outage ticket 202 (e.g., a geographic keyword table, a cluster name keyword table, or another type of keyword table). In some implementations, the keyword table is based on keywords on one or more sites to which the outage ticket 202 belonged. Then, in some implementations, the service incident resolution system 206 refines the updated service incident scores based on the number and/or strength of tokenizes to entries in the keyword table.

In some implementations, the service incident resolution system 206 refines the service incident resolution scores based on other correlations between incident tickets and the outage ticket 202. For example, the service incident resolution system 206 increases service incident scores for incident tickets based on geographic (e.g., region or country) information, where the closer two requests are located, the larger the service incident score is refined.

As shown, the service incident monitoring model 210 includes an act 508 of generating a ranked list of relevant monitoring incident tickets for the outage ticket 202. In various implementations, the service incident resolution system 206 utilizes the service incident monitoring model 210 to rank, order, or otherwise organize the incident tickets in the first set by service incident scores (e.g., the refined service incident scores). For example, the service incident resolution system 206 ranks the incident tickets in the first set from highest-to-lowest service incident scores. In various implementations, the service incident resolution system 206 ranks the incident tickets based on their service incident scores irrespective of their monitoring service groups. In some implementations, the service incident resolution system 206 selects the top incident tickets from each monitoring service group and ranks the selected request.

Further, as shown in FIG. 5, the service incident resolution system 206 provides the ranked list of monitoring incident tickets 212. In this manner, the ranked list of monitoring incident tickets 212 indicates which monitoring signal and/or requests are most important to mitigating the service incident associated with the outage ticket 202.

Figure 6:
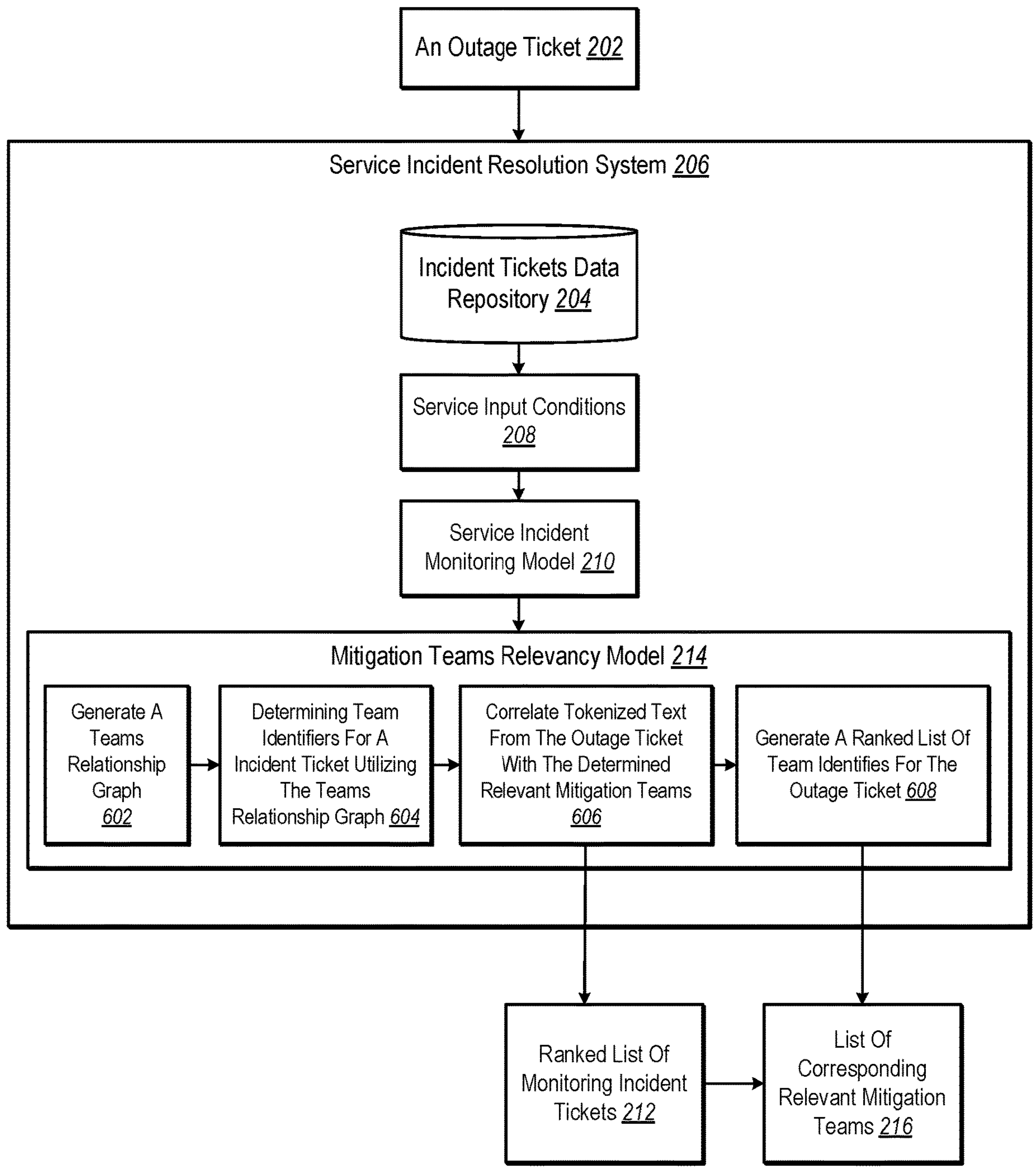
FIG. 6 illustrates an example process flow for utilizing a service mitigation teams relevancy model to generate a ranked list of relevant mitigation teams corresponding to the outage ticket in accordance with one or more implementations.

In some implementations, the service incident resolution system 206 additionally provides a list of corresponding relevant mitigation teams 216, as mentioned above in FIG. 2. For example, the service incident resolution system 206 draws on previous incident tickets to determine where to route the outage ticket 202 for an accurate and speedy resolution, which also prevents outage tickets from being incorrectly assigned to the wrong team identifier (e.g., an ID unique to a team). FIG. 6 provides more details regarding generating a ranked list of relevant mitigation teams that correspond to incident tickets in the ranked list of monitoring incident tickets 212.

As additional context, relevant mitigation teams indicate which mitigation service or user team is well-suited to troubleshoot and resolve a given outage. For example, a correct relevant mitigation team includes one or more designated responsible individuals-users responsible for the availability, health, and incident management of the service affected by the outage. In some instances, a designated responsible individual includes one or more on-call engineers or technicians, who belong to a support group or team associated with the team identifier.

As shown, FIG. 6 illustrates an example of utilizing a service mitigation teams relevancy model to generate a ranked list of relevant mitigation teams corresponding to the outage ticket in accordance with one or more implementations. FIG. 6 also includes many of the components shown in FIG. 2 with the mitigation teams relevancy model 214 expanded to include example acts.

To illustrate, FIG. 6 shows that the mitigation teams relevancy model 214 includes an act 602 of generating a teams relationship graph. In various implementations, the service incident resolution system 206 utilizes the mitigation teams relevancy model 214 to generate a graph of relevant mitigation teams relationships based on previous incident tickets (e.g., historical data) from the incident tickets data repository 204 and/or another data repository of incident tickets/outages. For example, in various implementations, the service incident resolution system 206 generates a teams relationship graph that includes incident tickets and relevant mitigation teams. The teams relationship graph includes paths that indicate when an incident ticket was moved or reassigned from one relevant mitigation teams to another.

To elaborate, many outage tickets do not include enough information to be assigned to a specific team identifier. Additionally, in some instances, even with one or more corresponding monitoring incident tickets identified for the outage ticket, the service incident resolution system 206 is unable to distinctly assign an outage ticket to a team identifier. As a result, the outage ticket is assigned to a general-category team identifier, such as to a triage group. Occasionally, upon being assessed, the incident ticket is then rerouted to a more specific relevant mitigation team. In some cases, an incident ticket is moved from one relevant mitigation team to another relevant mitigation team. Accordingly, these moves are reflected within the teams relationship graph.

In various implementations, the teams relationship graph includes the number of paths between relevant mitigation teams and at which an incident ticket ultimately ended. As an example, the teams relationship graph shows that 80% of incident tickets assigned to a first general-category relevant mitigation teams are moved to a first specific-category team identifier. As another example, the teams relationship graph also shows that 20% of those moved incident tickets are again moved to a second specific-category team identifier. In this example, the service incident resolution system 206 determines that for incident tickets assigned to the first group general-category team identifier, 60% end up at the first specific-category relevant mitigation teams and 20% end up at the first specific-category team identifier.

In one or more implementations, the teams relationship graph includes additional contextual information regarding relationships between previous incident tickets and relevant mitigation teams. For example, the teams relationship graph includes different versions based on one or more data fields associated with an incident ticket. As another example, the service incident resolution system 206 modifies the teams relationship graph based on time windows, severity levels, and/or other information, which affects which paths are included.

As shown, the mitigation teams relevancy model 214 includes an act 604 of determining relevant mitigation teams utilizing the teams relationship graph. In various implementations, the service incident resolution system 206 utilizes the mitigation teams relevancy model 214 to identify relevant mitigation teams for an incident ticket based on the teams relationship graph. For example, when an outage ticket is assigned to a given general-category team identifier, the service incident resolution system 206 utilizes the teams relationship graph to determine to which target relevant mitigation teams previous outage tickets were moved when originally assigned to the given team identifier.

To illustrate, suppose an outage ticket is assigned to the relevant mitigation teams of Triage-A. The service incident resolution system 206 identifies Triage-A on the teams relationship graph and determines to which relevant mitigation teams previous outage tickets were moved from Triage-A. In some implementations, the service incident resolution system 206 also determines the percentage, ratio, or proportion of incident tickets that move to the target incident tickets.

As shown, the mitigation teams relevancy model 214 includes an act 606 of correlating tokenized text from the outage ticket with the determined relevant mitigation teams. In various implementations, the service incident resolution system 206 tokenizes the outage ticket using natural-language processing by generating a list of explicit and/or representative/implicit tokens from outage tickets. For example, the service incident resolution system 206 tokenizes words in the text fields of the outage ticket. In particular, the service incident resolution system 206 tokenizes a media controller or title field of an outage ticket. In some implementations, the service incident resolution system 206 also tokenizes one or more monitoring incident tickets from the ranked list of monitoring incident tickets 212 corresponding to the outage ticket. Then, the service incident resolution system 206 matches tokens from the outage ticket to the title, description, or other data of a mitigation team.

Additionally, the service incident resolution system 206 correlates the tokenized text with relevant mitigation teams. For example, in various implementations, the service incident resolution system 206 modifies the percentages between relevant mitigation teams based on how closely the tokens correlate with the determined relevant mitigation teams. For instance, the service incident resolution system 206 increases the correlation strength (e.g., a correlation score based on the percentages described above) with a given relevant mitigation teams based on determining that a word of the user-impacting service (and/or a corresponding monitoring incident ticket) request correlates with a portion of the title of the given team identifier. Similarly, for relevant mitigation teams that have weaker, smaller, or no correlation, the service incident resolution system 206 reduces its correlation strength.

As shown, the mitigation teams relevancy model 214 includes an act 608 of generating a list of corresponding relevant mitigation teams 216 for the outage ticket 202. In various implementations, the service incident resolution system 206 orders, sorts, ranks, or arranges the determined relevant mitigation teams for the outage ticket 202 based on their correlation strengths, then provides the list of corresponding relevant mitigation teams 216. In various implementations, the service incident resolution system 206 filters out relevant mitigation teams that are below a correlation strength threshold. Accordingly, in many cases, the ranked list indicates reliable probabilities of which relevant mitigation teams the outage ticket 202 should be assigned.

In some implementations, the list of corresponding relevant mitigation teams 216 is connected with the ranked list of monitoring incident tickets 212. For example, the service incident resolution system 206 provides the ranked list of monitoring incident tickets 212 and the list of corresponding relevant mitigation teams 216 for the outage ticket 202. In some implementations, the service incident resolution system 206 provides the list of corresponding relevant mitigation teams 216 without the ranked list of monitoring incident tickets 212, as indicated in FIG. 6.

In some implementations, a cloud computing system includes a hierarchy of services. In some instances, the cloud computing system receives incident tickets (e.g., outage ticket) that only indicate incidents for the top-level services (e.g., the cloud computing system is not working), when the incidents are occurring at lower, more granular levels (e.g., Service A and B are faulty). In these implementations, the incident tickets are too broad to determine correlated monitoring incident tickets. Accordingly, the service incident resolution system 206 can utilize an external incident systems model to identify useful outage tickets from the vast amount of noisy and vague ones (e.g., containing sparse amounts of information).

Figure 7:
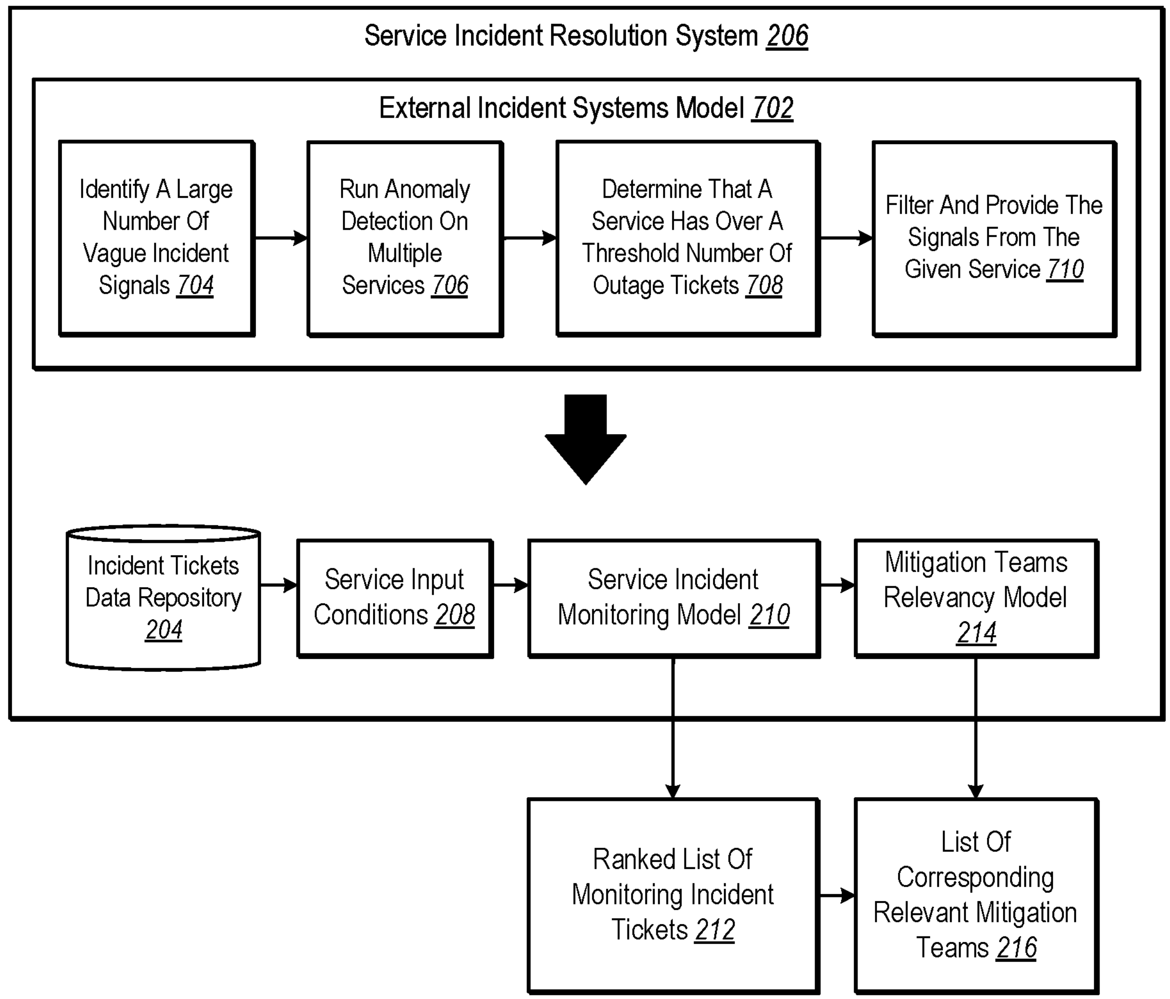
FIG. 7 illustrates an example process flow for utilizing an external incident systems model in accordance with one or more implementations.

To illustrate, FIG. 7 shows an example of utilizing an external incident systems model in accordance with one or more implementations. FIG. 7 includes similar components to FIG. 2 with the difference of an external incident systems model 702 in place of the outage ticket 202. Indeed, the service incident resolution system 206 utilizes the external incident systems model 702 to identify usable outage tickets, as described below.

As shown, the external incident systems model 702 includes an act 704 of identifying a large number of vague or sparse outage signals (e.g., outage signals that do not include enough information to be useful by themselves). As mentioned above, the cloud computing system may be bombarded with incident and outage signals that trigger incident tickets.

FIG. 7 also shows that the external incident systems model 702 includes an act 706 of running anomaly detection on multiple services or applications as part of determining which service or application many of the incident signals may correspond to from among the multiple services or applications. For example, the service incident resolution system 206 runs one or more anomaly detection models on the outage tickets to identify patterns between groups of requests. In various implementations, the service incident resolution system 206 runs anomaly detection in parallel with multiple services. In this way, the service incident resolution system 206 determines clusters of outage tickets that are related based on one or more common characteristics (e.g., time, geographic region, external monitoring service).

Additionally, the external incident systems model 702 also includes an act 708 of determining that a service has over a threshold number of outage tickets. In various implementations, the service incident resolution system 206 determines that the number of outage tickets in one or more clusters corresponding to a given service meets a threshold number of outage tickets. Indeed, the service incident resolution system 206 identifies a service that includes a threshold number of related outage tickets.

Further, the external incident systems model 702 also includes an act 710 of filtering and providing the signals from the given service. For example, the service incident resolution system 206 provides one or more of the outage tickets corresponding to the identified service to the rest of the system, which generates the ranked list of monitoring incident tickets 212 and/or list of corresponding relevant mitigation teams 216, as described above.

Figure 8:
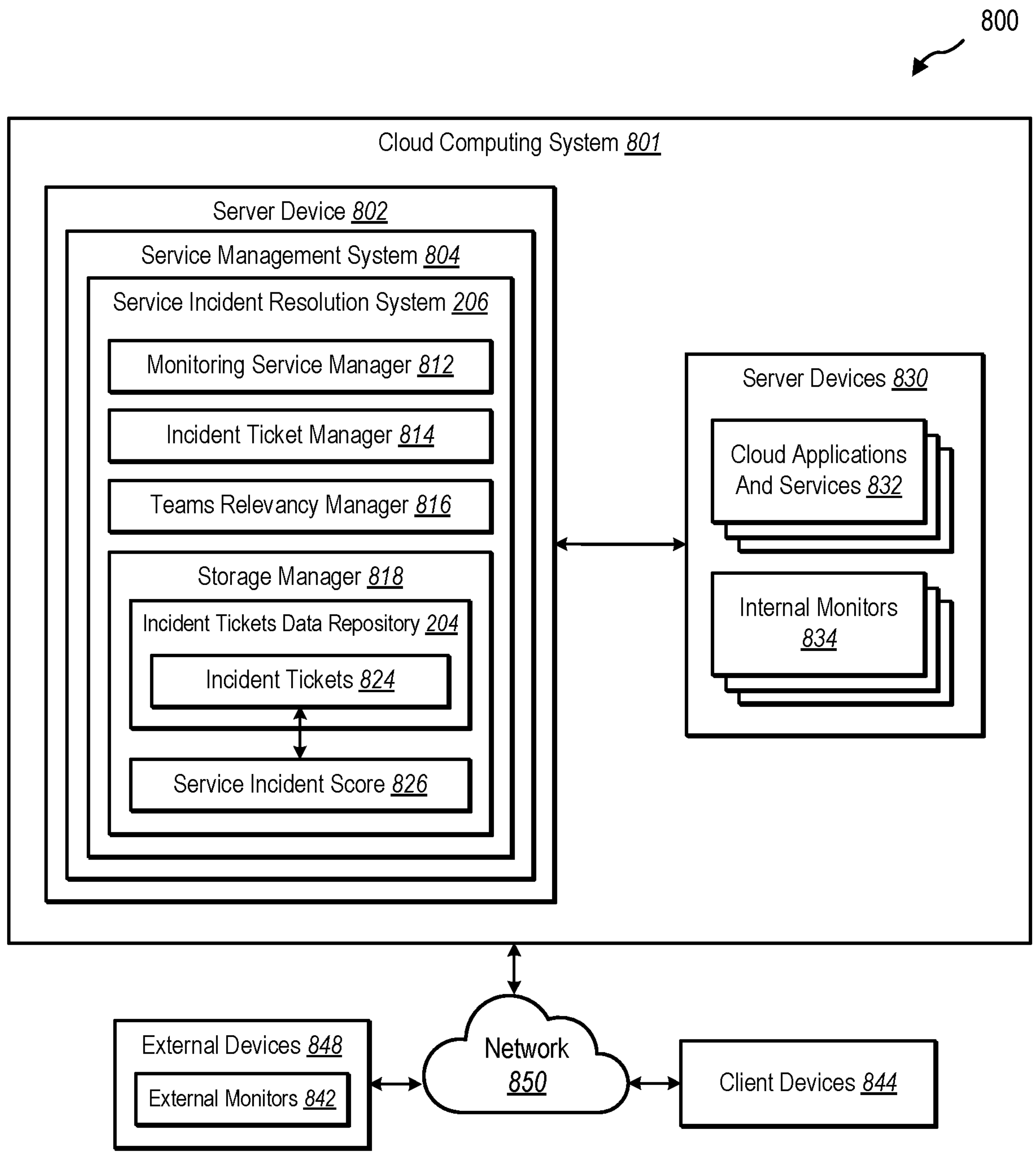
FIG. 8 illustrates an example cloud computing system environment where a service incident resolution system is implemented in accordance with one or more implementations.

Additional details will now be provided regarding the components and elements of the service incident resolution system. For example, FIG. 8 illustrates an example environment 800 that includes a cloud computing system 801, where a service incident resolution system is implemented in accordance with one or more implementations. FIG. 8 merely shows an example arrangement and configuration and other arrangements and configurations are possible.

In particular, the environment 800 includes the cloud computing system 801 having server devices 802, 830, external devices 848, and client devices 844, which communicate via a network 850. Additional details regarding these and other computing devices are provided below in connection with FIG. 10. In addition, FIG. 10 also provides additional details regarding networks, such as the network 850 shown.

As shown, the cloud computing system 801 includes server devices 830 that include cloud applications and services 832 (as described above) as well as internal monitors 834. For example, the internal monitors 834 include monitoring services that monitor signals within the cloud computing system 801 and generate monitoring incident tickets, as described above.

Along these lines, external monitors 842 on the external devices 848 also provide incident tickets to the cloud computing system 801. For example, users associated with the client devices 844 utilize the external monitors 842 (e.g., a down detector service) to report incidents with the cloud computing system 801, which the external monitors 842 provide to the cloud computing system 801, as described above.

Returning to the cloud computing system 801, as shown, the cloud computing system 801 includes a server device 802 having a service management system 804 and the service incident resolution system 206. In general, the service management system 804 manages various services and applications of the cloud computing system 801, such as the cloud application and services 832. As also shown, the service management system 804 also includes service incident resolution system 206.

As shown, the service incident resolution system 206 includes various components and elements, which are implemented in hardware and/or software. For example, the service incident resolution system 206 includes a monitoring service manager 812 for managing monitoring services, an incident ticket manager 814 for managing incident tickets, a teams relevancy manager 816 for managing relevant mitigation teams, and a storage manager 818 for storing and providing access to data used by the service incident resolution system 206. For example, the service incident resolution system 206 includes the incident tickets data repository 204 having incident tickets 824, and a service incident score 826.

Components of the service incident resolution system 206 correspond to functions of the service incident resolution system 206 previously described. For example, the incident ticket manager 814 utilizes the service incident monitoring model 210 to generate service incident scores 826 and/or ranked lists of monitoring incident tickets, as described above. Similarly, in various implementations, the teams relevancy manager 816 utilizes the mitigation teams relevancy model 214 to generate ranked lists of corresponding relevant mitigation teams, as described above.

Figure 9:
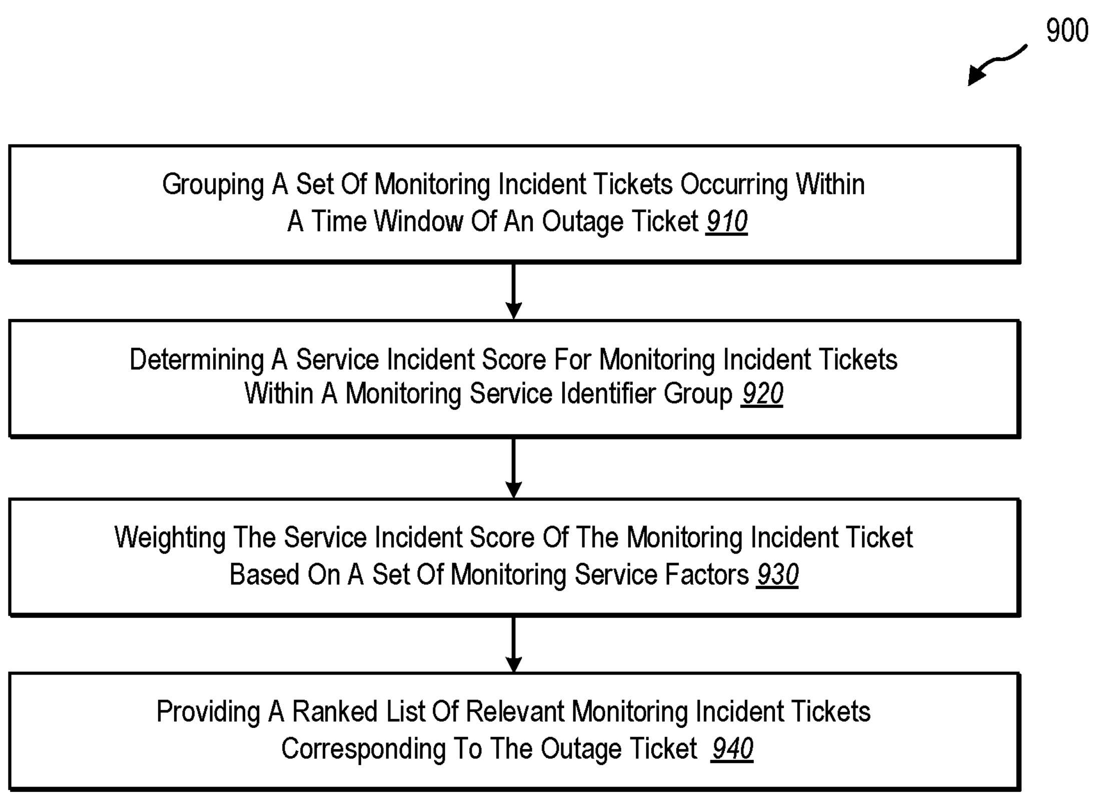
FIG. 9 illustrates an example series of acts for determining a ranked list of relevant monitoring incident tickets corresponding to an outage ticket in accordance with one or more implementations.

Turning now to FIG. 9, this figure illustrates an example flowchart that includes a series of acts 900 for utilizing the service incident resolution system 206 in accordance with one or more implementations. In particular, FIG. 9 illustrates an example series of acts for determining a ranked list of relevant monitoring incident tickets corresponding to an outage ticket in accordance with one or more implementations.

While FIG. 9 illustrates acts according to one or more implementations, alternative implementations may omit, add to, reorder, and/or modify any of the acts shown. Further, the acts of FIG. 9 can be performed as part of a method (e.g., a computer-implemented method). Alternatively, a non-transitory computer-readable medium can include instructions that, when executed by a processing system comprising a processor, cause a computing device to perform the acts of FIG. 9. In still further implementations, a system (e.g., a processing system comprising a processor) can perform the acts of FIG. 9.

As shown, the series of acts 900 includes an act 910 of grouping a set of monitoring incident tickets occurring within a window time of an outage ticket. For instance, in example implementations, the act 910 involves grouping a set of monitoring incident tickets occurring within a target time window of the outage ticket (e.g., service incident signal) by monitoring service identifiers based on identifying an outage ticket that corresponds to a user-impacting incident (e.g., in response to receiving an outage ticket). In various implementations, the act 910 includes determining, from an incident tickets data repository, monitoring incident tickets that match a target outage status, a target impact status, one or more target severity levels and that occur within a target time window of an outage ticket.

In various implementations, the act 910 includes comprising generating a collection of monitoring incident tickets based on matching a target outage status, a target impact status, and a target severity level (e.g., one or more target severity levels) from monitoring incident tickets in an incident tickets data repository, where the set of monitoring incident tickets that occurred within the target time window of the outage ticket are selected from the collection of monitoring incident tickets. In some implementations, the act 910 includes sorting a monitoring service identifier group according to assigned relevant mitigation teams before (or after) generating the initial service incident score.

In some instances, the set of monitoring incident tickets is from an incident tickets data repository. In various instances, the set of monitoring incident tickets in the incident tickets data repository includes an impact status, an outage status, a severity level, a request time, a team identifier, a monitoring service identifier, one or more monitor signals, a title, a service environment, and a request count.

As further shown, the series of acts 900 includes an act 920 of determining a service incident score for monitoring incident tickets within a monitoring service identifier group. For instance, in example implementations, the act 920 involves determining an initial service incident score based on a plurality of monitoring incident tickets within a given monitoring service identifier group associated with a given monitoring service identifier based on elapsed times between each of the plurality of monitoring incident tickets and corresponding consecutive monitoring incident tickets of the given monitoring service identifier.

In one or more implementations, the act 920 includes generating, upon grouping the set of monitoring incident tickets by monitoring service identifiers, an initial service incident score based on a plurality of monitoring incident tickets grouped to a given monitoring service identifier based on a median duration since between each of the plurality of monitoring incident tickets and corresponding consecutive monitoring incident tickets with the given monitoring service identifier.

In one or more implementations, the act 920 includes determining the initial service incident score for the plurality of monitoring incident tickets by determining a median duration based on the elapsed times between each of the plurality of monitoring incident tickets and one or more monitoring incident tickets having the given monitoring service identifier within a predetermined time window (e.g., 1 year, 700 days, 5 years, 1000 day).

As further shown, the series of acts 900 includes an act 930 of weighting the service incident score of the monitoring incident ticket based on a set of monitoring service factors. For instance, in example implementations, the act 930 involves updating the initial service incident score for a given monitoring incident ticket of the plurality of monitoring incident tickets by weighting the initial service incident score of the given monitoring incident ticket based on a set of monitoring service factors to generate a service incident score for the given monitoring incident ticket.

In one or more implementations, the act 930 includes generating a service incident score for a given monitoring incident ticket of the plurality of monitoring incident tickets by updating the initial service incident score for a given monitoring incident ticket by weighting the initial service incident score of the given monitoring incident ticket based on a set of monitoring service factors.

In some cases, the act 930 (or another act of the series of acts 900) includes refining the service incident score for the given monitoring incident ticket by matching portions of the plurality of monitoring incident tickets grouped with the given monitoring service identifier to one or more keywords from a keyword table (e.g., geographic, cluster name, or other type of keyword table) corresponding to the outage ticket. In some instances, refining the service incident score for the given monitoring service identifier includes tokenizing one or more words in titles or text fields of the given monitoring incident ticket, comparing tokenized words to the keyword table corresponding to the outage ticket, and/or increasing the service incident score for the given monitoring incident ticket based on identifying matches between the keyword table and the tokenized words.

In various implementations, the set of monitoring service factors utilized to generate the service incident score corresponds to the given monitoring incident ticket and includes a threshold reached count corresponding to a number of times signals in the given monitoring incident ticket have reached a critical threshold for the given monitoring service identifier. In some implementations, one or more monitoring incident tickets of the sets of monitoring incident tickets that occur within a time overlapping time threshold of the given monitoring incident ticket are combined with the given monitoring incident ticket. In additional implementations, the set of monitoring service factors utilized to generate the service incident score for the given monitoring incident ticket includes a distinct monitoring incident ticket count corresponding to a number of different monitoring incident tickets within the given monitoring incident ticket.

In one or more implementations, the set of monitoring service factors utilized to generate the service incident score for the given monitoring incident ticket includes a reached threshold count corresponding to a number of times signals in the given monitoring incident ticket has reached a critical threshold for the given monitoring service identifier, a distinct monitoring incident ticket count corresponding to a number of different monitoring incident tickets within the given monitoring incident ticket, and/or a duration between the given monitoring incident ticket and a previous (or next) monitoring incident ticket of the given monitoring service identifier.

As further shown, the series of acts 900 includes an act 940 of providing a ranked list of relevant monitoring incident tickets corresponding to the outage ticket. For instance, in example implementations, the act 940 involves providing a ranked list of relevant monitoring incident tickets corresponding to the outage ticket, where the ranked list of relevant monitoring incident tickets is ranked according to service incident scores of the set of monitoring incident tickets and includes the given monitoring incident ticket. In one or more implementations, the act 940 includes providing a ranked list of relevant monitoring incident tickets corresponding to the outage ticket.

In various implementations, the act 940 or another act of the series of acts 900 includes dynamically updating the ranked list of relevant monitoring incident tickets as additional monitoring incident tickets are received in connection with the given monitoring service identifier. In some cases, the ranked list of relevant monitoring incident tickets is ranked according to service incident scores of the set of monitoring incident tickets and includes the given monitoring incident ticket.

In some implementations, the series of acts 900 includes additional acts. For example, in certain implementations, the series of acts 900 includes supplementing the ranked list of relevant monitoring incident tickets with one or more relevant mitigation teams. For example, the series of acts 900 includes generating a relevant mitigation teams list for the outage ticket utilizing a teams relationship graph generated by a mitigation teams relevancy model. Additionally, in some cases, the series of acts 900 includes generating the teams relationship graph utilizing the mitigation teams relevancy model by processing previous incident tickets (e.g., historical service incident data) to indicate relationships between relevant mitigation teams. In one or more cases, the series of acts 900 includes generating the relevant mitigation teams list for the user by correlating tokenized text from a title field of the outage ticket with relevant mitigation teams in the teams relationship graph. In various implementations, the series of acts 900 includes providing the outage ticket and one or more monitoring incident tickets on the ranked list of relevant monitoring incident tickets to a top-ranked relevant mitigation teams from the relevant mitigation teams list.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above are also included within the scope of computer-readable media.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the service incident resolution system 206. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 10:
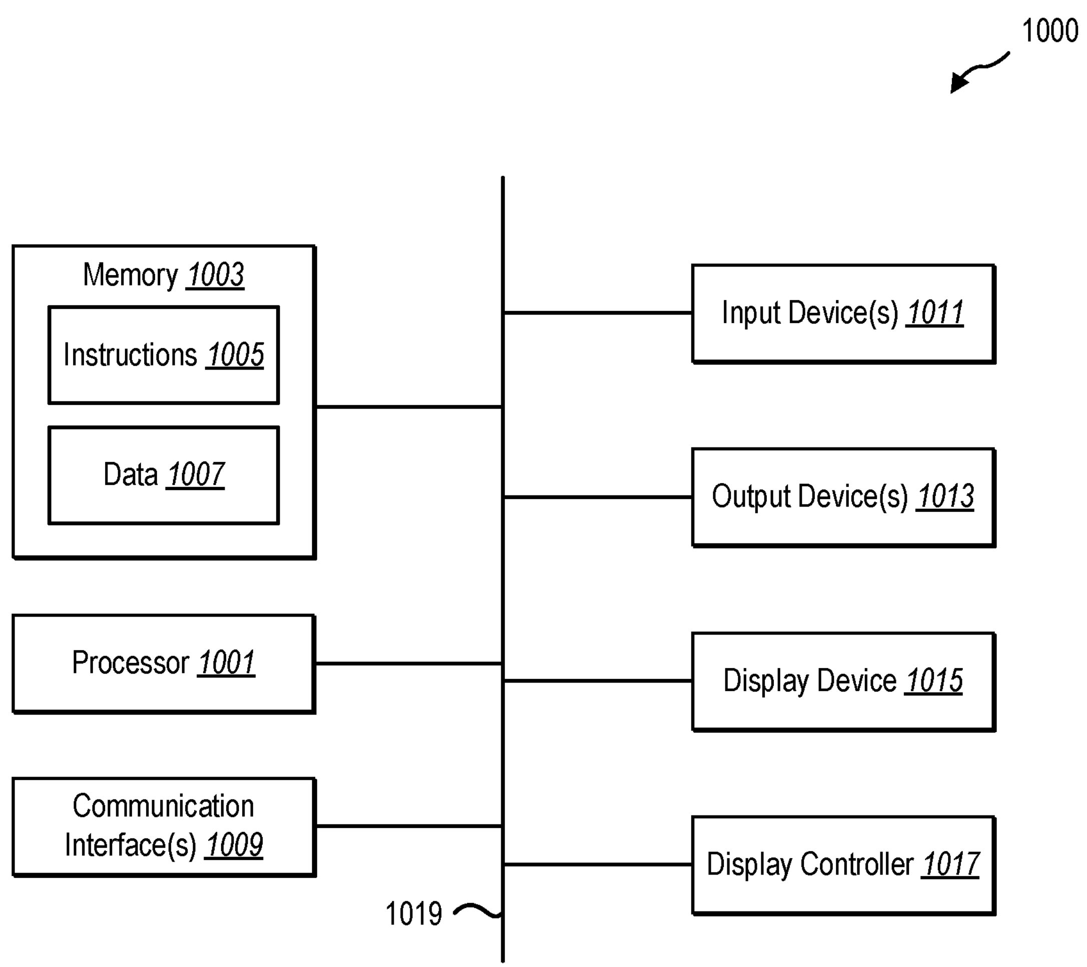
FIG. 10 illustrates example components included within a computer system.

FIG. 10 illustrates certain components that may be included within a computer system 1000. The computer system 1000 may be used to implement the various computing devices, components, and systems described herein. As used herein, a "computing device" refers to electronic components that perform a set of operations based on a set of programmed instructions. Computing devices include groups of electronic components, client devices, sever devices, etc.

In various implementations, the computer system 1000 represents one or more of the client devices, server devices, or other computing devices described above. For example, the computer system 1000 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1000 includes a processing system including a processor 1001. The processor 1001 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 1001 may be referred to as a central processing unit (CPU). Although the processor 1001 shown is just a single processor in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 1005 and the data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during the execution of the instructions 1005 by the processor 1001.

A computer system 1000 may also include one or more communication interface(s) 1009 for communicating with other electronic devices. The one or more communication interface(s) 1009 may be based on wired communication technology, wireless communication technology, or both. Some examples of the one or more communication interface (s) 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computer system 1000 may also include one or more input device(s) 1011 and one or more output device(s) 1013. Some examples of the one or more input device(s) 1011 include a keyboard, mouse, microphone, remote control device, button, joystick, trackball, touchpad, and light pen. Some examples of the one or more output device(s) 1013 include a speaker and a printer. A specific type of output device that is typically included in a computer system 1000 is a display device 1015. The display device 1015 used with implementations disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For clarity, the various buses are illustrated in FIG. 10 as a bus system 1019.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like.

Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for mitigating an outage on a cloud computing system, comprising:

identifying an outage ticket for an outage that corresponds to a user-impacting incident within the cloud computing system;

grouping a set of monitoring incident tickets by monitoring service identifiers, the set of monitoring incident tickets occurring within a target time window of the outage ticket;

determining an initial group service incident score for a plurality of monitoring incident tickets within a given monitoring service identifier group associated with a given monitoring service identifier, the initial group service incident score being based on elapsed times between each of the plurality of monitoring incident tickets and corresponding consecutive monitoring incident tickets of the given monitoring service identifier, wherein each monitoring incident ticket of the plurality of monitoring incident tickets shares the initial group service incident score;

for each monitoring incident ticket of the plurality of monitoring incident tickets, generating a service incident score for the given monitoring incident ticket by weighting the initial group service incident score of the given monitoring incident ticket based on a set of monitoring service factors;

generating a ranked list of relevant monitoring incident tickets based on the service incident scores of the plurality of monitoring incident tickets;

generating tokenized text from the outage ticket and from monitoring incident tickets from the ranked list of relevant monitoring incident tickets;

correlating the tokenized text from the outage ticket and from the monitoring incident tickets from the ranked list of relevant monitoring incident tickets with text or metadata of a set of relevant mitigation teams to generate a list of corresponding relevant mitigation teams for the outage ticket;

ranking the corresponding relevant mitigation teams in the list of corresponding relevant mitigation teams based on correlation strengths; and providing the outage ticket and one or more monitoring incident tickets on the ranked list of relevant monitoring incident tickets to a top-ranked mitigation team from the list of corresponding relevant mitigation teams, wherein the top-ranked mitigation team uses information from the outage ticket and the one or more monitoring incident tickets on the ranked list of relevant monitoring incident tickets to identify and resolve the outage.

2. The computer-implemented method of claim 1, further comprising generating a collection of monitoring incident tickets based on matching a target outage status, a target impact status, and a target severity level from monitoring incident tickets in an incident tickets data repository, wherein the set of monitoring incident tickets occurring within the target time window of the outage ticket are selected from the collection of monitoring incident tickets.

3. The computer-implemented method of claim 2, wherein weighting the initial group service incident score of the given monitoring incident ticket is based on monitoring service factor metrics specific to the given monitoring incident ticket from the set of monitoring service factors.

4. The computer-implemented method of claim 1, further comprising refining, before providing the ranked list of relevant monitoring incident tickets, the service incident score for the given monitoring incident ticket by matching portions of the given monitoring incident ticket to a keyword from a keyword table corresponding to the outage ticket.

5. The computer-implemented method of claim 4, wherein refining the service incident score for the given monitoring incident ticket includes:

tokenizing words in titles or text fields of the given monitoring incident ticket;

comparing tokenized words to the keyword table corresponding to the outage ticket; and increasing the service incident score for the given monitoring incident ticket based on identifying matches between the keyword table and the tokenized words.

6. The computer-implemented method of claim 1, wherein determining the initial group service incident score based on the plurality of monitoring incident tickets is further based on determining a median duration based on the elapsed times between each of the plurality of monitoring incident tickets and the corresponding consecutive monitoring incident tickets having the given monitoring service identifier within a predetermined time window.

7. The computer-implemented method of claim 1, wherein the set of monitoring service factors utilized to generate the service incident score:

corresponds to the given monitoring incident ticket; and includes a reached threshold count corresponding to a number of times signals in the given monitoring incident ticket have reached a critical threshold for the given monitoring service identifier.

8. The computer-implemented method of claim 7, wherein:

a monitoring incident ticket of the set of monitoring incident tickets occurring within a time overlapping time threshold of the given monitoring incident ticket is combined with the given monitoring incident ticket; and the set of monitoring service factors utilized to generate the service incident score for the given monitoring incident ticket includes a distinct monitoring incident ticket count corresponding to a number of different monitoring incident tickets within the given monitoring incident ticket.

9. The computer-implemented method of claim 1, wherein the set of monitoring incident tickets is from an incident tickets data repository and includes an impact status, an outage status, a severity level, a request time, a team identifier, a monitoring service identifier, a monitor signal, a title, a service environment, and a hit count.

10. The computer-implemented method of claim 1, further comprising dynamically updating the ranked list of relevant monitoring incident tickets as additional monitoring incident tickets are received in connection with the given monitoring service identifier.

11. A system comprising:

a data repository of monitoring incident tickets;

a processing system comprising a processor; and a computer memory comprising instructions that, when executed by the processing system, cause the system to carry out operations comprising:

based on identifying an outage ticket for an outage that corresponds to a user-impacting incident within a cloud computing system, generating monitoring service identifier groups by grouping a set of monitoring incident tickets from the data repository of monitoring incident tickets occurring within a target time window of the outage ticket by monitoring service identifiers;

determining an initial group service incident score for a plurality of monitoring incident tickets within a given monitoring service identifier group associated with a given monitoring service identifier based on elapsed times between each of the plurality of monitoring incident tickets and corresponding consecutive monitoring incident tickets of the given monitoring service identifier, wherein each monitoring incident ticket of the plurality of monitoring incident tickets shares the initial group service incident score;

for each monitoring incident ticket of the plurality of monitoring incident tickets, generating a service incident score for the given monitoring incident ticket by weighting the initial group service incident score of the given monitoring incident ticket based on a set of monitoring service factors;

generating a ranked list of relevant monitoring incident tickets based on the service incident scores of the plurality of monitoring incident tickets;

generating tokenized text from the outage ticket and from monitoring incident tickets from the ranked list of relevant monitoring incident tickets;

correlating the tokenized text from the outage ticket and from the monitoring tickets from the ranked list of relevant monitoring incident tickets with text or metadata of a set of relevant mitigation teams to generate a list of corresponding relevant mitigation teams for the outage ticket;

ranking the corresponding relevant mitigation teams in the list of corresponding relevant mitigation teams based on correlation strengths; and providing the outage ticket and one or more monitoring incident tickets on the ranked list of relevant monitoring incident tickets to a top-ranked mitigation team from the list of corresponding relevant mitigation teams, wherein the top-ranked mitigation team uses information from the outage ticket and the one or more monitoring incident tickets on the ranked list of relevant monitoring incident tickets to identify and resolve the outage.

12. The system of claim 11, wherein the set of relevant mitigation teams are determined using a teams relationship graph generated by a mitigation teams relevancy model.

13. The system of claim 12, wherein the operations further comprise generating the teams relationship graph utilizing the mitigation teams relevancy model by processing previous incident tickets to indicate relationships between relevant mitigation teams.

14. The system of claim 13, wherein the operations further comprise generating the relevant mitigation teams list by correlating tokenized text from a title field of the outage ticket with relevant mitigation teams in the teams relationship graph.

15. A computer-implemented method for mitigating an outage on a cloud computing system, comprising:

determining, from a service requests data repository, a set of monitoring incident tickets that match a target outage status within a cloud computing system, a target impact status, a target severity level and that occur within a target time window of an outage ticket;

generating, upon grouping the set of monitoring incident tickets by monitoring service identifiers, an initial group service incident score for a plurality of monitoring incident tickets within a given monitoring service identifier group associated with a given monitoring service identifier, the initial group service incident score being based on a median duration between each of the plurality of monitoring incident tickets and corresponding consecutive monitoring incident tickets with the given monitoring service identifier;

for each monitoring service incident ticket of the plurality of monitoring incident tickets, generating a service incident score for the given monitoring incident ticket by weighting the initial group service incident score of the given monitoring incident ticket based on a set of monitoring service factors;

refining the service incident score for the given monitoring incident ticket by matching portions of the plurality of monitoring incident tickets grouped with the given monitoring service identifier to keyword from a keyword table corresponding to the outage ticket;

generating a ranked list of relevant monitoring incident tickets based on the service incident scores of the plurality of monitoring incident tickets;

generating tokenized text from the outage ticket and from monitoring incident tickets from the ranked list of relevant monitoring incident tickets;

correlating the tokenized text from the outage ticket and from the monitoring incident tickets from the ranked list of relevant monitoring incident tickets with text or metadata of a set of relevant mitigation teams to generate a list of corresponding relevant mitigation teams for the outage ticket;

ranking the corresponding relevant mitigation teams in the list of corresponding relevant mitigation teams based on correlation strengths; and providing the outage ticket and one or more monitoring incident tickets on the ranked list of relevant monitoring incident tickets to a top-ranked mitigation team from the list of corresponding relevant mitigation teams, wherein the top-ranked mitigation team uses information from the outage ticket and the one or more monitoring incident tickets on the ranked list of relevant monitoring incident tickets to identify and resolve the outage.

16. The computer-implemented method of claim 15, wherein the set of monitoring service factors utilized to generate the service incident score for the given monitoring incident ticket include:

a reached threshold count corresponding to a number of times signals in the given monitoring incident ticket have reached a critical threshold for the given monitoring service identifier;

a distinct monitoring incident ticket count corresponding to a number of different monitoring incident tickets within the given monitoring incident ticket; and a duration between the given monitoring incident ticket and a previous monitoring incident ticket of the given monitoring service identifier.

17. The computer-implemented method of claim 15, wherein the set of relevant mitigation teams is determined using a teams relationship graph generated by a mitigation teams relevancy model.

* * * * *